United States Patent [19]
Hobgood et al.

[11] Patent Number: 5,383,191
[45] Date of Patent: * Jan. 17, 1995

[54] DUAL RING RECONFIGURATION SWITCHING UNIT

[75] Inventors: Robert B. Hobgood; Jay L. Smith, both of Raleigh; Robert D. Verne, Chapel Hill; Anthony D. Walker, Durham, all of N.C.

[73] Assignee: International Business Machines Corporation, Armonk, N.Y.

[*] Notice: The portion of the term of this patent subsequent to Jul. 21, 2009 has been disclaimed.

[21] Appl. No.: 633,649

[22] Filed: Dec. 20, 1990

[51] Int. Cl.⁶ .......................... G06F 11/00; H04J 3/02; H04J 1/16; H04Q 11/00
[52] U.S. Cl. .................................. 371/11.2; 371/11.1; 371/20.6; 370/85.15; 370/56; 370/16.1
[58] Field of Search ............... 370/85.15, 85.14, 85.12, 370/56, 16, 16.1; 371/20.6, 11.1, 11.2

[56] References Cited

U.S. PATENT DOCUMENTS

| | | | |
|---|---|---|---|
| 3,876,983 | 4/1975 | Zafiropulo et al. | 371/11.2 |
| 4,709,365 | 11/1987 | Beale et al. | 371/11.2 |
| 4,710,915 | 12/1987 | Kitahara | 370/16.1 |
| 4,899,142 | 2/1990 | Nakayaskiki et al. | 371/11.2 |
| 5,101,405 | 3/1992 | Bekki et al. | 370/85.15 |
| 5,132,962 | 7/1992 | Hobgood et al. | 370/16.1 |
| 5,150,356 | 9/1992 | Tsutsui | 370/85.12 |
| 5,280,586 | 1/1994 | Kunz et al. | 370/60.1 |
| 5,282,237 | 1/1994 | Babu et al. | 370/85.12 |

Primary Examiner—Robert W. Beausoliel, Jr.
Assistant Examiner—T. Tu
Attorney, Agent, or Firm—Joscelyn G. Cockburn

[57] ABSTRACT

A multiport access and reconfiguration unit for use in a dual token ring network is provided with three adapters and, depending on error conditions, can assume one of a plurality of recovery states in which a reconfigured single network is formed and at least one state in which an isolated single ring is formed in addition to the reconfigured ring.

6 Claims, 25 Drawing Sheets

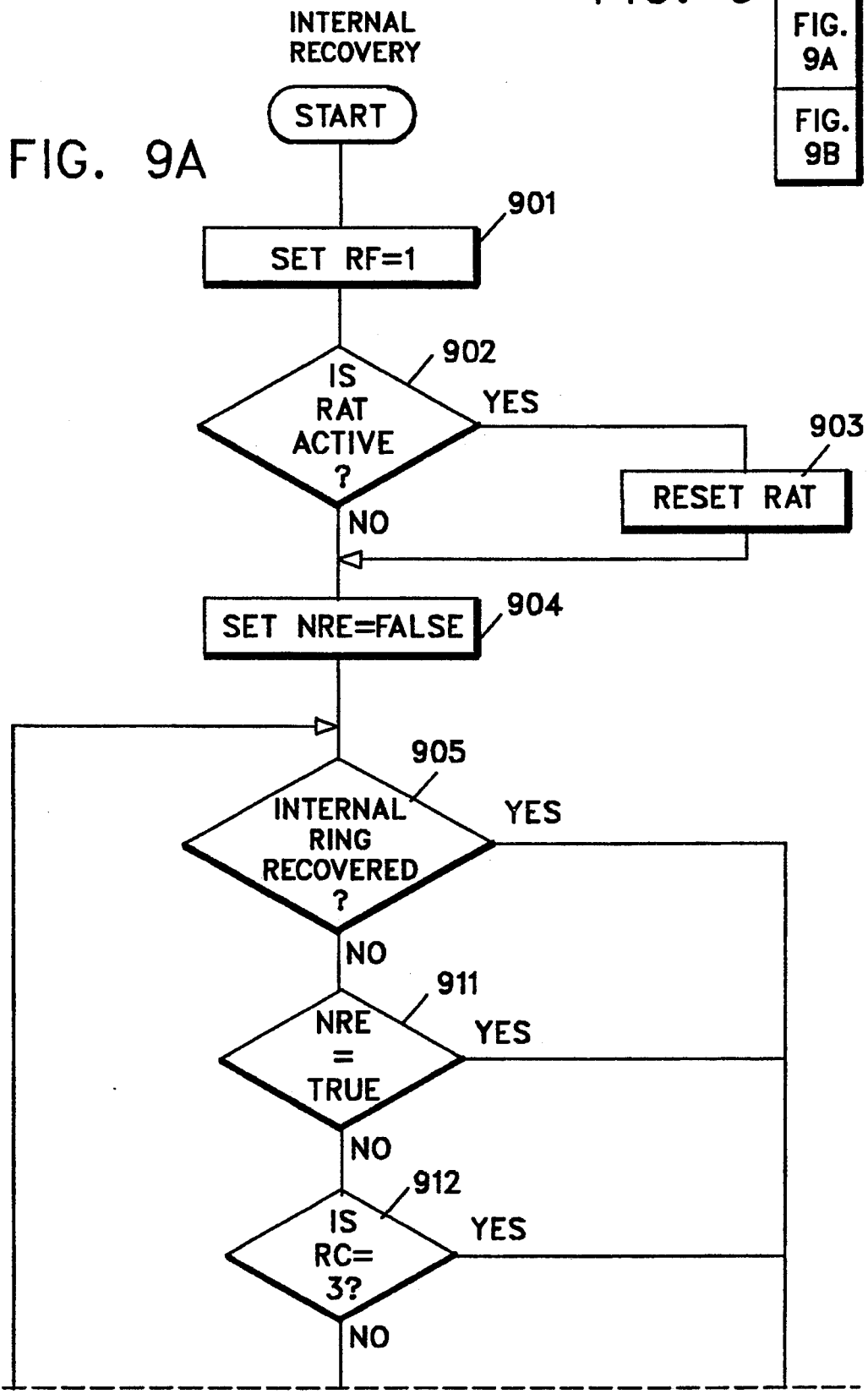

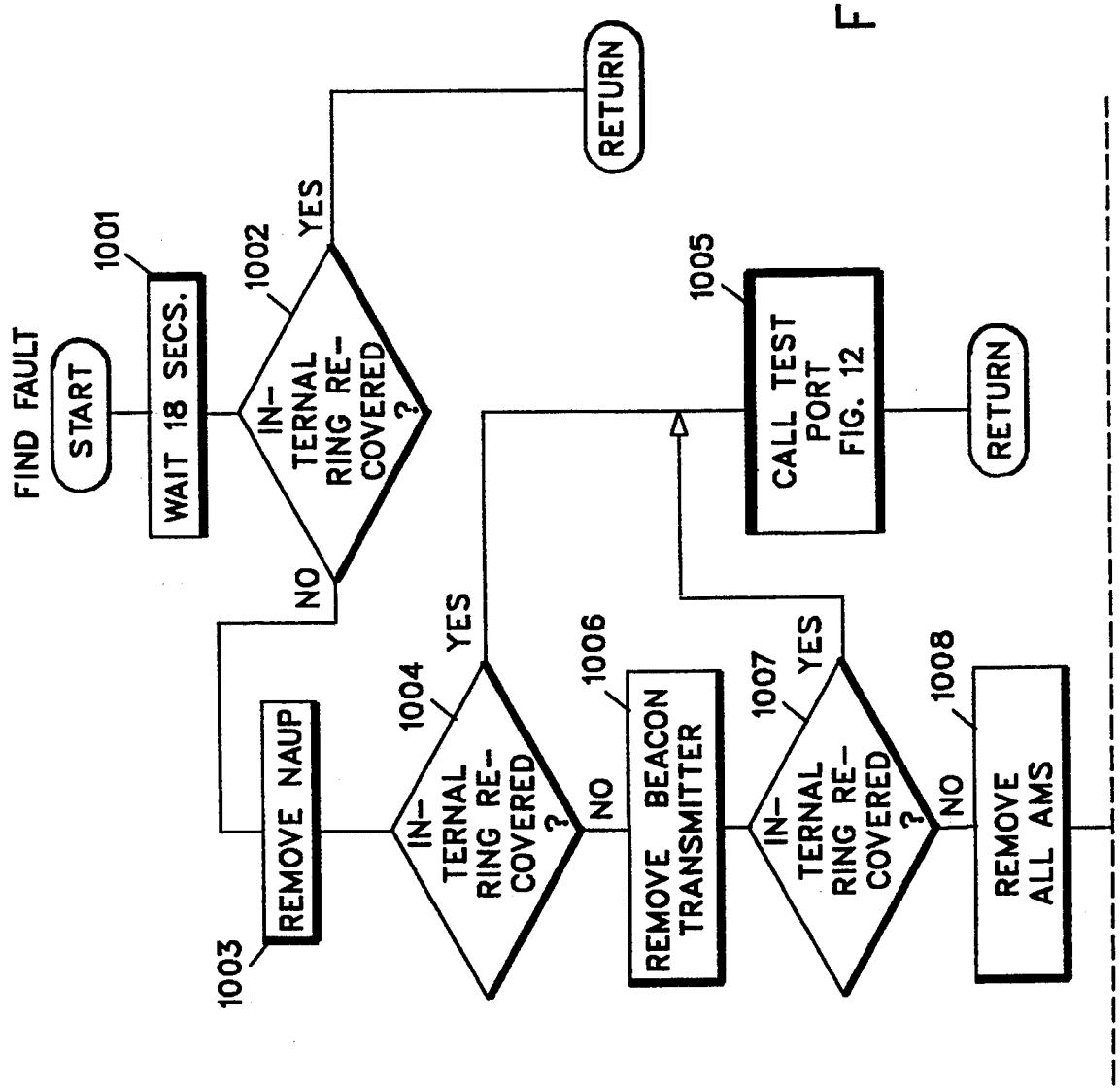

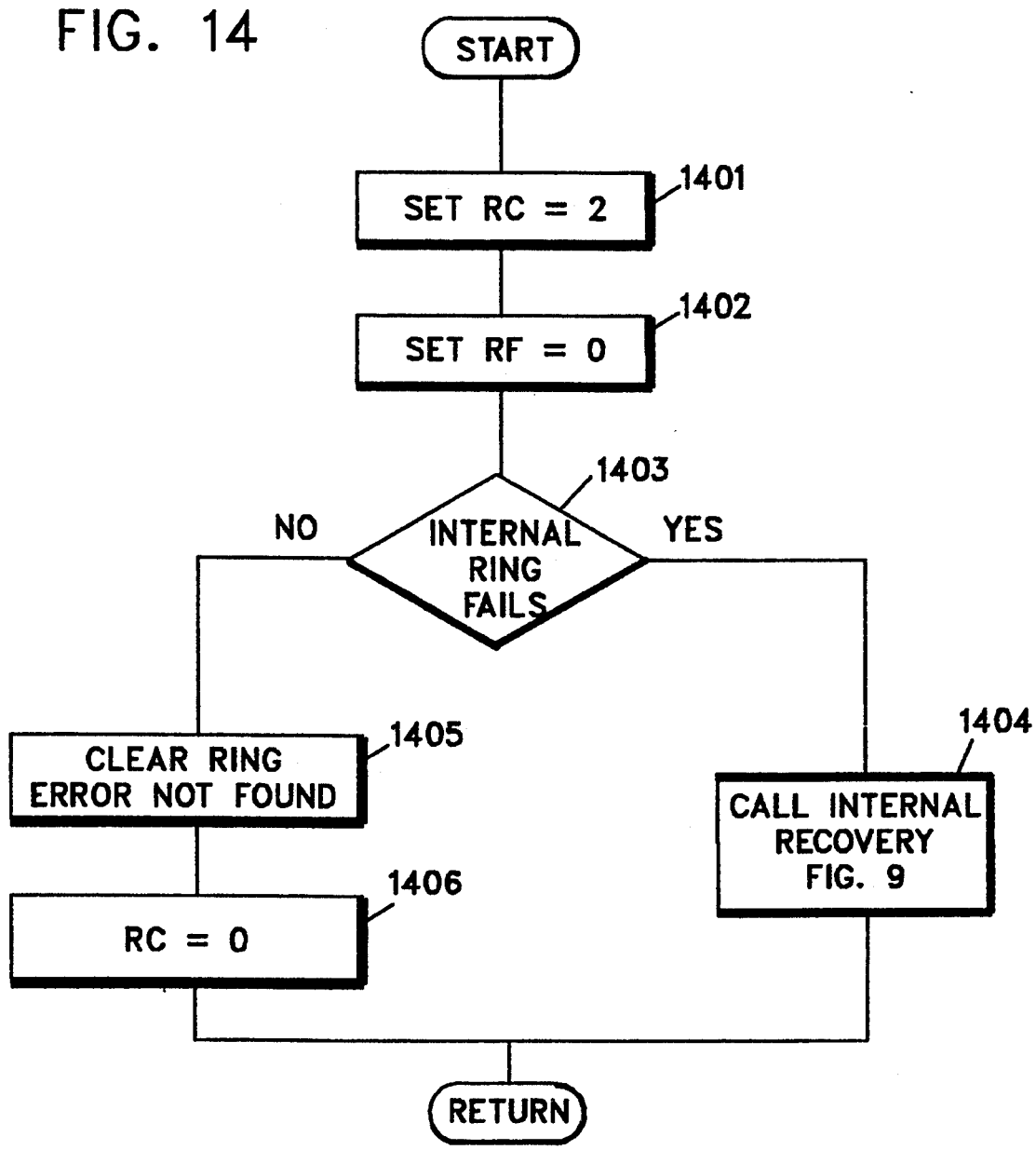

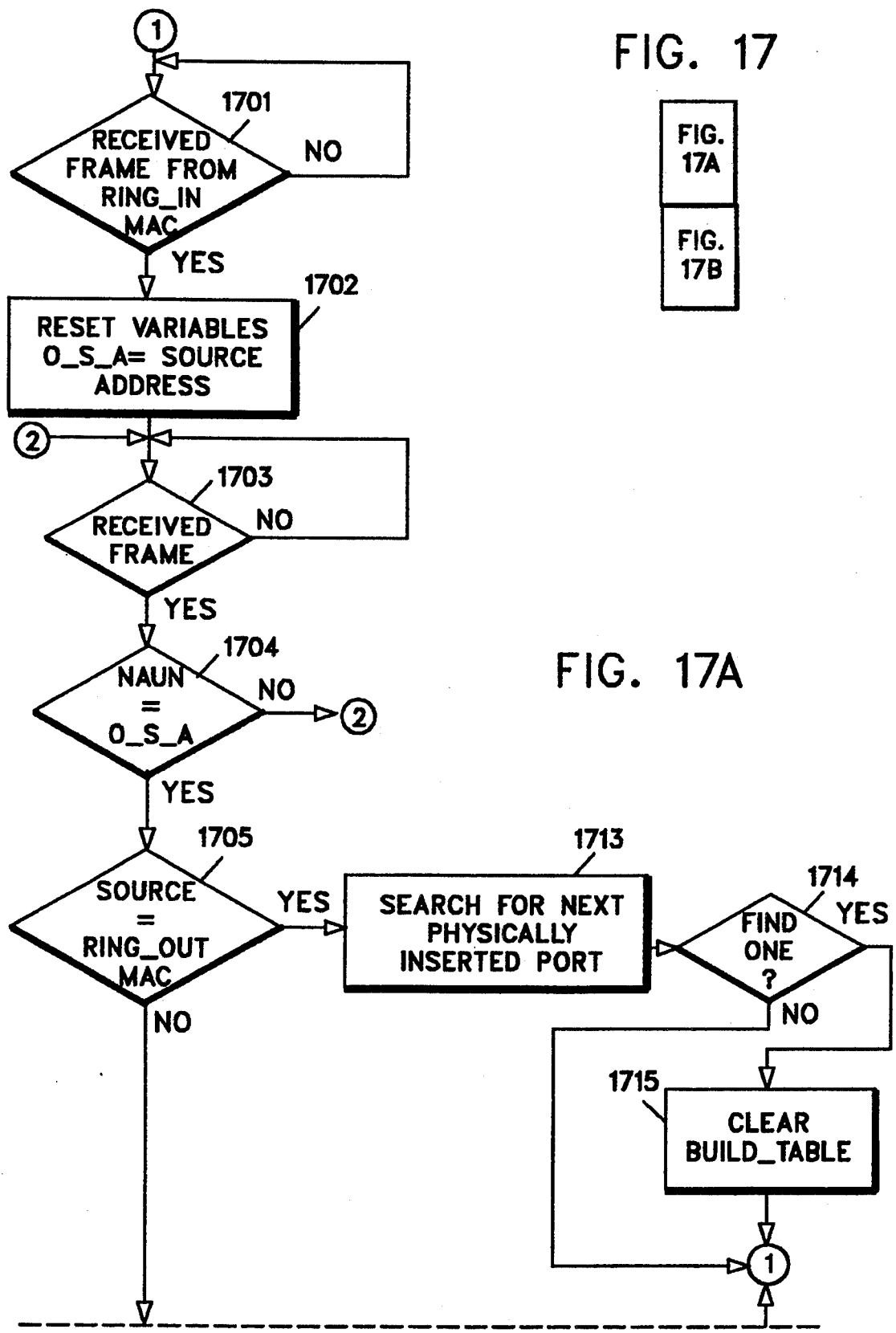

DUAL RING RECONFIGURATION SWITCHING UNIT

This invention relates to serial communication networks and more particularly to a multistate reconfiguration and access unit for use in a dual ring serial network.

BACKGROUND

Serial communication networks provide many advantages over other well-known networks such as multipoint, star or mesh networks, the most valuable being a fair distributed polling function which readily supports peer-to-peer communications amongst a large number of stations with a high utilization of the network capacity.

One major drawback of the serial network is its propensity to catastrophic failure when any component of the network fails.

Over the years many techniques have been developed to detect and/or isolate faults in serial communication networks. One of the more useful techniques, which is in use today in the IEEE 802.5 Token Ring, is disclosed in U.S. Pat. No. 3,564,145. This technique known as beaconing identifies a station, by its address, immediately down stream of a failed network component or station. In a static network (e.g. one in which the network topology is fixed or known) corrective action can be taken to bypass or fix the failed network component.

Another technique (Dual Ring Reconfiguration) has proven very useful in the isolation of faults in a serial network, thereby providing complete or partial network operation following the failure of a network component. This technique employs dual serial rings which may be converted to single ring via switching means to thereby bypass a failed network component. The patents listed below disclose a variety of Dual Ring Reconfiguration implementations:

U.S. Pat. Nos. 3,519,750, 4,527,270 3,876,983, 4,538,264, 4,009,469, 4,594,790, 4,354,267, 4,709,365, 4,390,984.

The patents listed below disclose a variety of manual and automatic techniques for bypassing a failed network component in a single ring serial network:

U.S. Pat. Nos. 3,458,661, 4,035,770, 4,048,446, 4,245,343, 4,763,329.

While all of the techniques described above are useful either by themselves or in combination, they are unable to provide fast, efficient or complete restoration of communications in a serial ring network following failures of aH kinds.

Modern serial networks such as the IEEE 802.5 Token Ring Network generally employ many (up to several hundred or more) ports located throughout an establishment. Many of these ports are not utilized or are connected to inactive stations. In addition, stations (each of which includes a unique identity or address) are frequently moved from one port to another for the convenience of the operator.

In view of the mobility of the stations and the large number of ports which have no or inactive stations connected, the station identity or address accompanying a beacon message provides little information to locate the geographic position of the failed network component.

The technique (Next Active Upstream Neighbor) disclosed in U.S. Pat. No. 4,507,777 is very useful in managing fault recovery in serial networks; however, the sequential station identities or addresses derived from this technique do not provide sufficient network topology information to accurately pinpoint the physical location of the failed component. For example, two adjacent active stations may be separated on the physical network by a number of non-connected or inactive ports. Thus, knowing that station X detected a failure and that station C preceded X does not physically locate a particular faulty component.

Current serial ring communication networks have no automated provision for developing an accurate network topology which accurately associates each physical port with the identity or address of an active station connected thereto. Two solutions, neither of which is practical, have been considered. Each station upon activation could input its identity or address along with a network defined location to a database or manager. This task could be accomplished manually by an operator. This is a burdensome task and would require cooperative human operators at every station. On the other hand, sufficient intelligence could be provided at each port to automatically provide the location information either to the station for automatic transmittal to a database or network manager or directly when a station connected thereto becomes active. Such a solution is impractical from a cost standpoint alone.

SUMMARY OF THE INVENTION

The invention contemplates a multistate reconfiguration and access unit for attachment to a dual ring serial network. The unit includes: inputs and outputs for connection to the primary and secondary rings of the dual network; three adapters for receiving and retransmitting and/or generating signals; a plurality of ports for attaching data terminals or the like; a first controllable switching means for selectively connecting the ports in series circuit; a second multistate reconfiguration switch connected to the inputs and outputs, the three adapters and the first controllable switching means for interconnecting the connected elements in one of a plurality of configurations in response to control signals; and a programmed processor connected to the adapters for receiving signals therefrom indicative of the operation of the network and for generating control signals corresponding thereto and for applying the generated control signals to the second multistate reconfiguration switch for causing it to assume a corresponding one of the plural configurations.

DETAILED DESCRIPTION OF THE INVENTION

Figure 1:
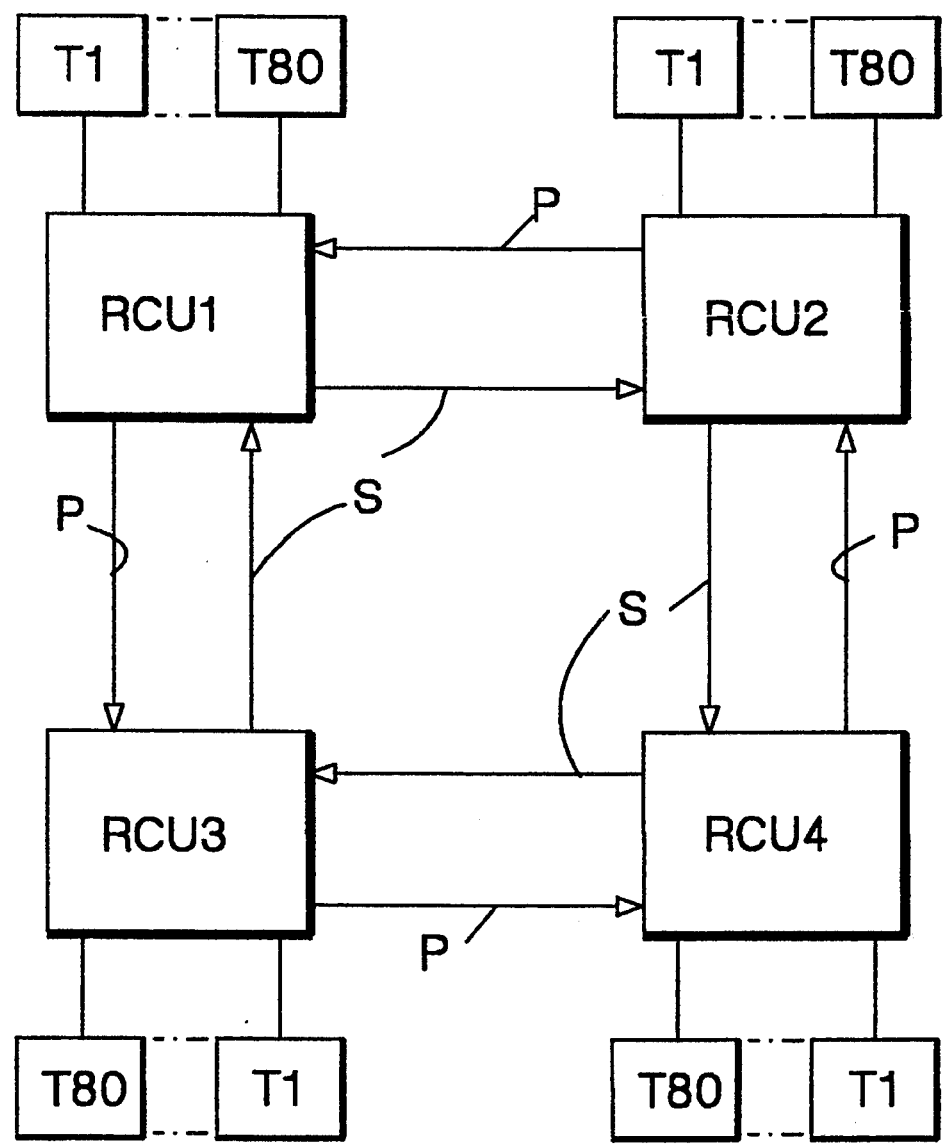
FIG. 1 is a block diagram of a dual ring network including reconfiguration units contracted according to the invention.

FIG. 1 illustrates a dual token ring network which include four reconfiguration units RCU1-RCU4. These units are interconnected by a primary ring P and a secondary ring S. Each RCU is provided with eighty ports and can attach up to eighty devices such as terminals T to the primary ring during normal or no fault operation. When so connected, any device Ti can communicate with any other device Ti±a via the primary ring P provided the other device is connected and operational.

In the event of a failure of a component or link in the primary ring, the primary and secondary rings will be reconfigured via switching networks in one or more RCU's to form a single ring over which all or some of the devices T may continue to communicate until the failed component is replaced or repaired. How this is accomplished will be described hereinafter in conjunction with the description of the drawings. In order to support reconfiguration, the unidirectional signal flows in the P and S rings are in opposite directions as indicated by the direction arrows of the link segments P and S illustrated in FIG. 1.

Figure 2:
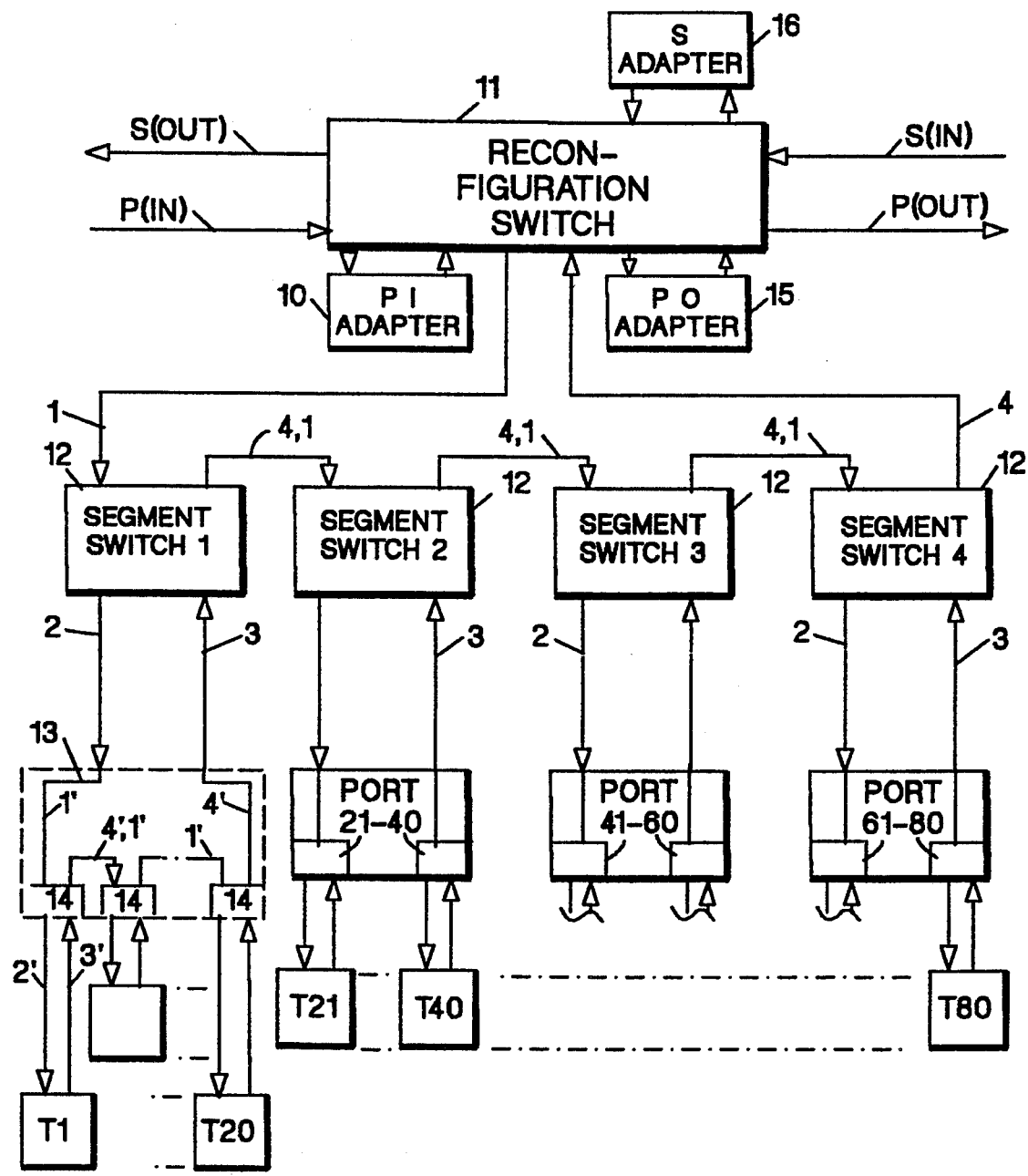
FIG. 2 is a block diagram of the novel reconfiguration unit illustrating network information signal flow.
Figure 3:
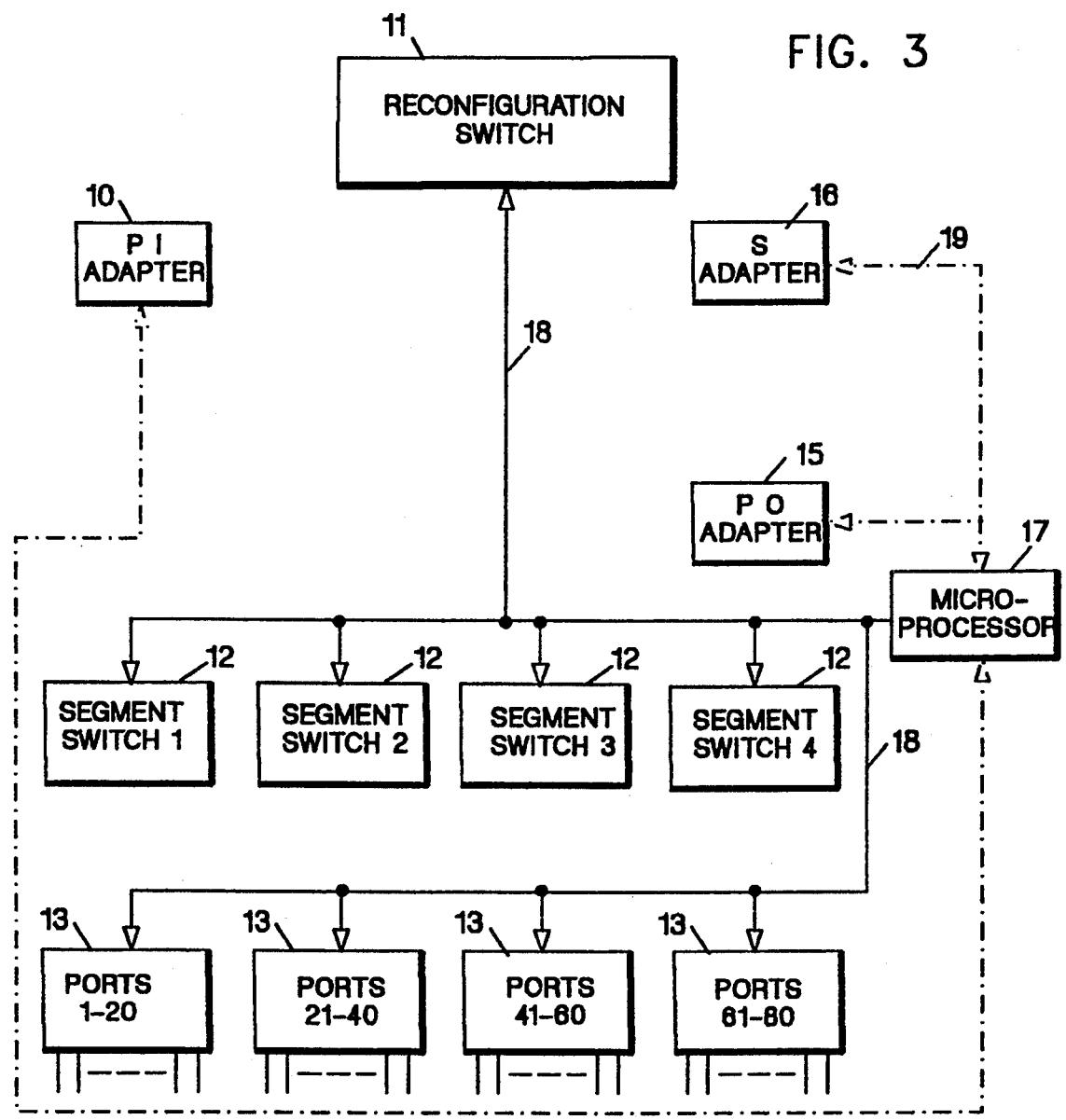
FIG. 3 is a block diagram similar to FIG. 2 illustrating internal communication (non-network) within the reconfiguration unit.

FIGS. 2 and 3 are block diagrams of a single RCU. In FIG. 2 only information signal (or data) flow is illustrated while FIG. 3 illustrates only internal communication between the various components of the RCU. The same reference numerals will be used for the same components in both FIGS. 2 and 3.

A reconfiguration switch 11 is connected to the primary and secondary rings, through adapters 10, 15 and 16 and four serially connected segment switches 12 and the eighty ports they serve. Switch 11 can be in anyone of the switching states illustrated in FIGS. 4A-4D and will interconnect the adapters, the ports served by the segment switches. A more detailed discussion of these states will be provided below; however, the description which follows will assume that switch 11 is in the normal state illustrated in FIG. 4A.

The information signals passed on by PI adapter 10 are applied to a first segment switch 12 via reconfiguration switch 11 over a conductor 1. Segment switch 12 is a relay operated multiple pole double throw switch which in one position connects conductor 1 to conductor 2 and conductor 3 to conductor 4. In its alternate position, conductor 1 is directly connected to conductor 4 and conductor 2 is connected to conductor 3.

Conductor 2 is connected to one input of a port module 13 which includes twenty ports to which a device such as terminal T can be connected. Each port is provided with a relay operated multiple pole double throw switch 14 similar to segment switch 12 and when in one state connects conductor 1' to conductor 2' and conductor 3' to conductor 4'. Conductor 4' of the first port is connected to conductor 1' of the second port and thus forms a series connection of all ports having switches in this state. Conductor 4' of the last port switch is connected to conductor 3 connected to the first segment switch 12.

If all of the ports are active (i.e. have active devices T connected) all of the switches 14 will be in the first state described and devices T1-T20 will be connected in series and the information signals passed on by PI adapter 10 will pass serially through devices T1-T20 and returned to the first segment switch 12. The second, third and fourth segment switches 12 and their associated ports and connected device will operate in a like manner.

Conductor 4 of the fourth segment switch 12 is connected to the input of PO adapter 15 by reconfiguration switch 11 and the output of adapter 15 is connected to the primary ring P(out).

In the normal mode, information signals arriving at P(in) pass in series through PI adapter 10, the first segment switch 12 and active connected devices T1-T20; thereafter in series through the remaining segment switches 12 and active connected devices T associated therewith and then through PO adapter 15.

In the normal mode information signals on the secondary ring S pass directly through S adapter 16 via reconfiguration switch 11 to the output side of the S ring. If all of the RCUs are in this mode, the S ring carries no information signals from the devices T. In the other modes (FIGS. 4B-4D) information signals from the devices T traverse portions of both the primary and secondary rings which have been reconfigured into a single ring.

Segment switches 12 and port switches 14 are controlled by microprocessor 17 via the solid line conductors 18 schematically illustrated in FIG. 3. Adapters 10, 15 and 16 communicate with microprocessor 17 over a bus 19 shown in dashed line in FIG. 3.

Adapters 10, 15 and 16 may be substantially similar in construction and operation to the IBM 16/4 Token Ring Adapter/A. This adapter interfaces the token ring media and attaches to the input/output bus of the IBM PC or compatible personal computer. Information exchanges between the adapter and the PC are accomplished by a shared memory technique.

In this technique a memory area within which each device may both read and write is provided. The devices periodically check the memory to detect changes which result when one of the devices alters part or all of the memory content. A portion of this memory area includes a number of flag bits each of which is defined as to meaning and function.

In order to modify the adapter function, three (3) additional flags have been defined. A first flag (TBF) when set enables the adapter to transmit Beacon Reconfigure (BNR) frames. The BNR frames and the beacon normal (BNN) frames are defined as to format and content by the IEEE 802.5 standard. The second flag MBF instructs the adapter to transmit BNR frames in place of what it is receiving. A third flag DIS_TX instructs the adapter to break its transmit path which is accomplished by transmitting BNN frames in place of what it is receiving, if anything. The functions performed by microprocessor 17 described hereinafter and illustrated in the flow charts of FIGS. 5-17 may be executed by a properly programmed INTEL 80C186 microprocessor.

Figure 4A:
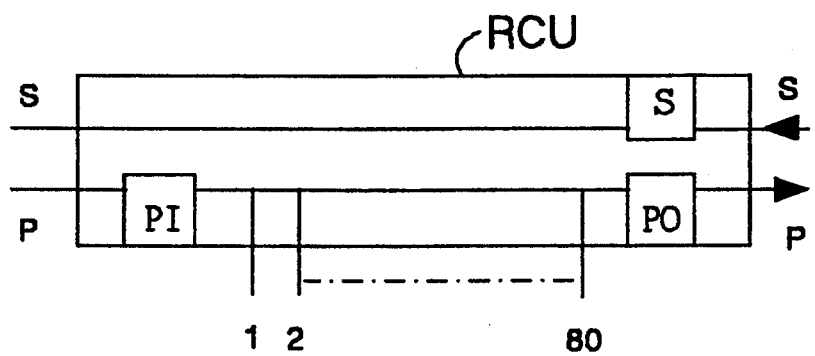
FIGS. 4A–4D illustrate the different switching states of the reconfiguration unit; and, FIGS. 5–17 are flowcharts illustrating the operation of the programmed microprocessor illustrated in FIGS. 2 and 3; and, FIGS. 18–20 are flowcharts illustrating the operation of new functions performed in the adapters illustrated in the drawings.

As previously described, the state of switch 11 illustrated in FIG. 4A is the normal state of the RCU. That is no failures are detected. In this state of switch 11 all of the ports are connected in series circuit between adapters 10 and 15 on the P ring and adapter 16 is inserted into the S ring.

If adapter 10 detects an upstream failure on the P ring, it generates normal beacon frames (BNN) and transmits BNN frames downstream via the series circuit to adapter 15. In addition, it sends a message indicating this condition to microprocessor 17 via bus 19. A failure can take several forms, the most common being no signal caused by a break in a cable or a failure in a circuit component of an upstream RCU. At this time, microprocessor 17 notes the failure and awaits additional information before changing the state of switch 11.

Adapter 15 upon receiving a BNN frame, transmits a beacon reconfigure frame BNR downstream on the primary ring P(out). At the same time, it notifies microprocessor 17 via bus 19. The message from adapter 15 is noted and the microprocessor 17 sends a message via bus 19 to adapter 16 which causes adapter 16 to transmit BNN frames downstream on the S ring. If both the upstream P and the downstream S rings are broken, the BNN frames from the adapter 16 will be undetected by any device. However, in this case the next downstream adapter 16 on the S ring of the adjacent RCU will have detected a break or failure and have initiated the transmission on the S ring of BNN frames. If on the other hand only the upstream P ring has failed, the BNN frames will reach the adapter 16 on the next downstream RCU on the S ring.

The BNR frames from adapter 15 travel downstream and each adapter 10 notifies its connected microprocessor 17 of the receipt of the BNR frame. The microprocessor 17 sets a timer and checks to see if its associated adapter 16 on the S ring has detected an upstream S ring failure on received a BNN frame. If neither event has been reported by adapter 16, it will take no action until the timer expires.

If the time interval is long enough, taking into consideration the propagation delay around the ring, the RCU immediately upstream of a failure in the primary ring P will have either detected a failure on the secondary ring S or received a BNN on that ring and a BNR on the primary ring before any other intervening RCUs have timed out.

Figure 4B:
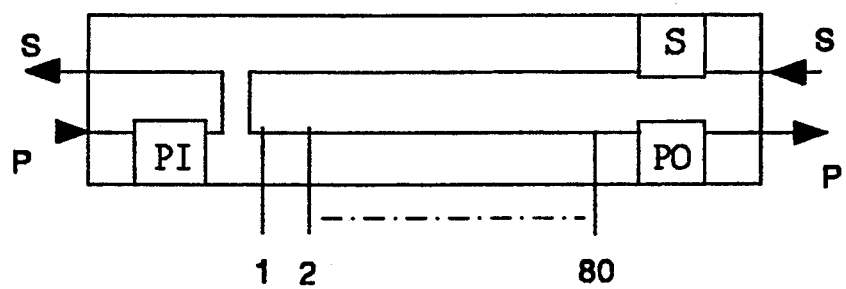
Figure 4C:
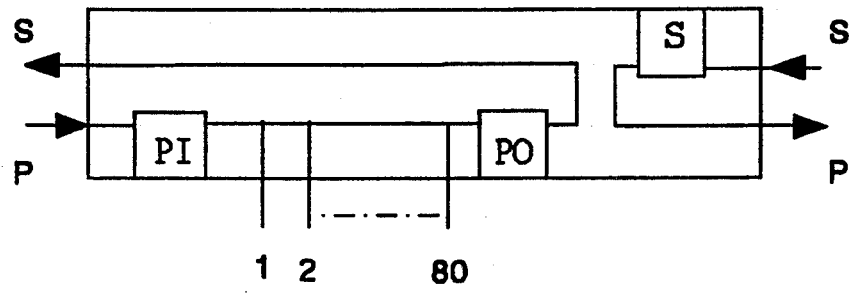

Upon satisfying the conditions set forth above, i.e. received BNR on P ring and either a BNN or detect failure on S ring, the microprocessor will reconfigure switch 11 to the state illustrated in FIG. 4C. In this state, the received BNR frame will be looped back on the secondary ring S. As this BNR frame is received by intervening adapters 16 the associated microprocessor resets the timeout period and remains in the normal mode.

When adapter 16 of the RCU which detected the upstream P ring failure receives the BNR frame initialized by its associated adapter 15, this is sent to the microprocessor 17 which recognizes adapter 15's identity and will after internal checks switch to the state illustrated in FIG. 4B. At this time the dual ring has been reconfigured and includes the detecting RCU at one end (FIG. 4B); the RCU upstream of the break or failure in the P ring at the other end (FIG. 4C); and as many intervening RCU as are connected in the normal state (FIG. 4A).

The failed ring segment includes the adapter 10 which detected the failure in the first place (FIG. 4B) and the adapter 16 of the RCU upstream of the failure on the P ring. These two adapters will send BNN frames which due to the failure will not be effective to restore dual ring operation. Once the failure is removed, one adapter will receive a complete BNN frame first and will retransmit this frame. When one of these adapters receives a BNN with its own identity, it knows the inoperative ring portion is complete or restored (i.e. the BNN frame made a round trip). At this time, normal recovery in accordance with the IEEE 802.5 standard is executed. When this is completed, the associated microprocessors command switches 11 to the normal state (FIG. 4A) and dual ring operation is restored.

It should be noted that in FIGS. 4A, 4B and 4C all of the ports 1-80 in the RCU are bracketed by two adapters. In FIGS. 4A and 4C adapters 10 and 15 bracket ports 1-80 while adapters 16 and 15 bracket ports 1-80 in FIG. 4B. In the state illustrated in FIG. 4D the ports 1-80 are connected to one adapter (16) only; however, they are isolated from all other ports on the network.

This circuit arrangement in conjunction with the ring poll function set forth in the IEEE 802.5 standard makes possible the correlation of the device identities by the microprocessor 17. The ring poll function is implemented in IEEE 802.5 Token Rings and is briefly described below. When the ring is first started or has recovered from a fault (which usually occurs when a device enters or leaves the ring), all of the devices enter a process to select the active device on the ring having the highest address or identity as the active monitor while all of the other devices assume the roll of standby monitors.

Once the process is completed, the active monitor transmits an active monitor present (AMP) frame. This frame includes a broadcast TO address field and its own address in the FROM address field. In addition, the frame includes a frame copied bit. Since the ring is serial, the next active downstream station receives the frame (since it includes a broadcast address) before any other station. Because the frame copied bit is not set, it knows that the active monitor is its next active upstream neighbor (NAUN) and stores this information. It also sets the frame copied bit before retransmitting this bit, thus subsequent devices on the ring will not mistakenly assume that the active monitor is their NAUN.

This device will wait for a token frame and will after receipt of a token frame transmit a standby monitor present (SMP) frame. Like the AMP frame it includes its device address in the FROM address field and a broadcast address in the TO address field and a frame copied bit. The next active downstream device repeats the process described above.

The process repeats until the active monitor receives a SMP frame with a frame copied bit not set. At this time each active device on the ring has acquired the address or identity of its NAUN and the ring poll process is complete; however, the existing process described above can not identify or correlate the devices with the ports to which they are connected since the information available to do this is inadequate. Any station can copy the identities of the devices in order; however, it would not obtain sufficient information to correlate the identities of the devices with any particular port or physical location.

According to the invention one adapter 10/15 passes all ring poll messages received to microprocessor 17 including its own ring poll message. Thus in sequence microprocessor 17, as does the ring monitor, receives all of the identities of the devices on the ring; however, unlike the ring monitor it knows the bracketing identities of its own adapters 10/15/16 and the status of the eighty ports there between and therefore has sufficient information available to correlate these identities with the active ports. The correlation is deemed accurate if the number of identities or addresses received equals the number of active ports. If additional reliability is desired, the microprocessor can wait for two ring poll cycles before declaring the correlation accurate.

Once this information is obtained, it can be transmitted by the microprocessor via one of the adapters (10/15/16) to a manager program such as the IBM LAN Network Manager program resident on one of the devices. The manager program can in this manner receive from all the RCUs precise topology information for the entire network. One of the outstanding advantages of the invention is the generation of this topology information with no changes to existing devices or addition of intelligent devices at each port.

In accordance with the IEEE 802.5 standard, a device connected to a port which wants to be connected to the network must provide a d.c. signal. This signal causes switch 14 to insert the device if the processor 17 has enabled the port. The signal is also sent over bus 18 to the processor 17. Thus, the processor 17 has sufficient information to maintain a table of active/inactive ports. The device will maintain the d.c. current as long as it is active and if it powers down or becomes inactive for any other reason, the d.c. is removed and microprocessor 17 senses this condition and the loss of d.c. current switches 14 to its alternate state or bypass and changes the status of the port to bypassed in the table.

During the ring poll process, microprocessor 17 builds a table which includes the identities of those stations whose identities are bracketed by the identities of the selected two of the three attached adapters (10, 15 and 16). In the absence of a failure (e.g. a device did not remove the d.c. insert signal but failed to respond in the ring poll sequence), the number of reporting stations will equal the number of active ports and since the identities are provided sequentially, they can be readily correlated to the specific ports at which they reside.

Another source of apparent error can occur when a device goes active after the ring poll passes its port but before the ring poll sequence completes. In order to increase the reliability of the data collected, it may be desirable to allow two ring poll sequences to take place before considering the data to be accurate.

As can be seen from the above, the provision of the three adapters 10, 15 and 16 permits implementation of the topology generation under the configurations illustrated in FIGS. 4A-4C and still provides for an adapter connected to the non-operative ring portion (FIGS. 4B and 4C) dedicated to recovery when the fault which occasioned the switch state change disappears. In the state illustrated in FIG. 4D, the devices connected via adapter 16 are isolated from the remainder of the network and all ring poll messages or any other information provided by adapter 16 are all associated with devices connected to the ports which microprocessor 17 controls.

In the isolated state (FIG. 4D) adapter 16 is connected in a single ring along with any active devices connected to the RCU via its ports. In addition to being the power down state of the RCU, it will be entered when a fault internal to the RCU and/or its connected devices or cables is detected. This state allows the remainder of the network to operate as a single loop while the microprocessor 17 determines the location of the internal fault and restores local operation via operation of either one or more port switches 14 and/or operation of one or more segment switches 12 when appropriate.

A fifth state (similar to FIG. 4D except adapters S and PO are interchanged) exists when two faults exist at the same time on the ring, one fault being upstream of adapter 10 of the RCU and the other fault being downstream of adapter 15 of the RCU. In this state adapter 10 is connected to the non-operative ring on the upstream side of the RCU and adapter 16 is connected to the non-operative ring on the downstream side. Adapter 15 is connected to an isolated operational ring along with any active devices connected to the RCU.

Figure 15:
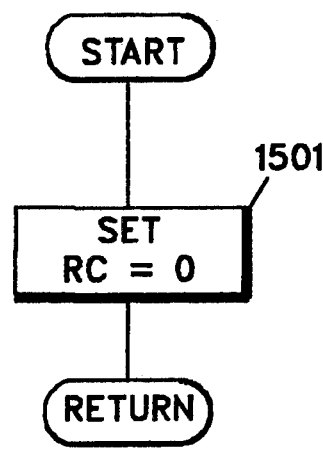
Figure 13:
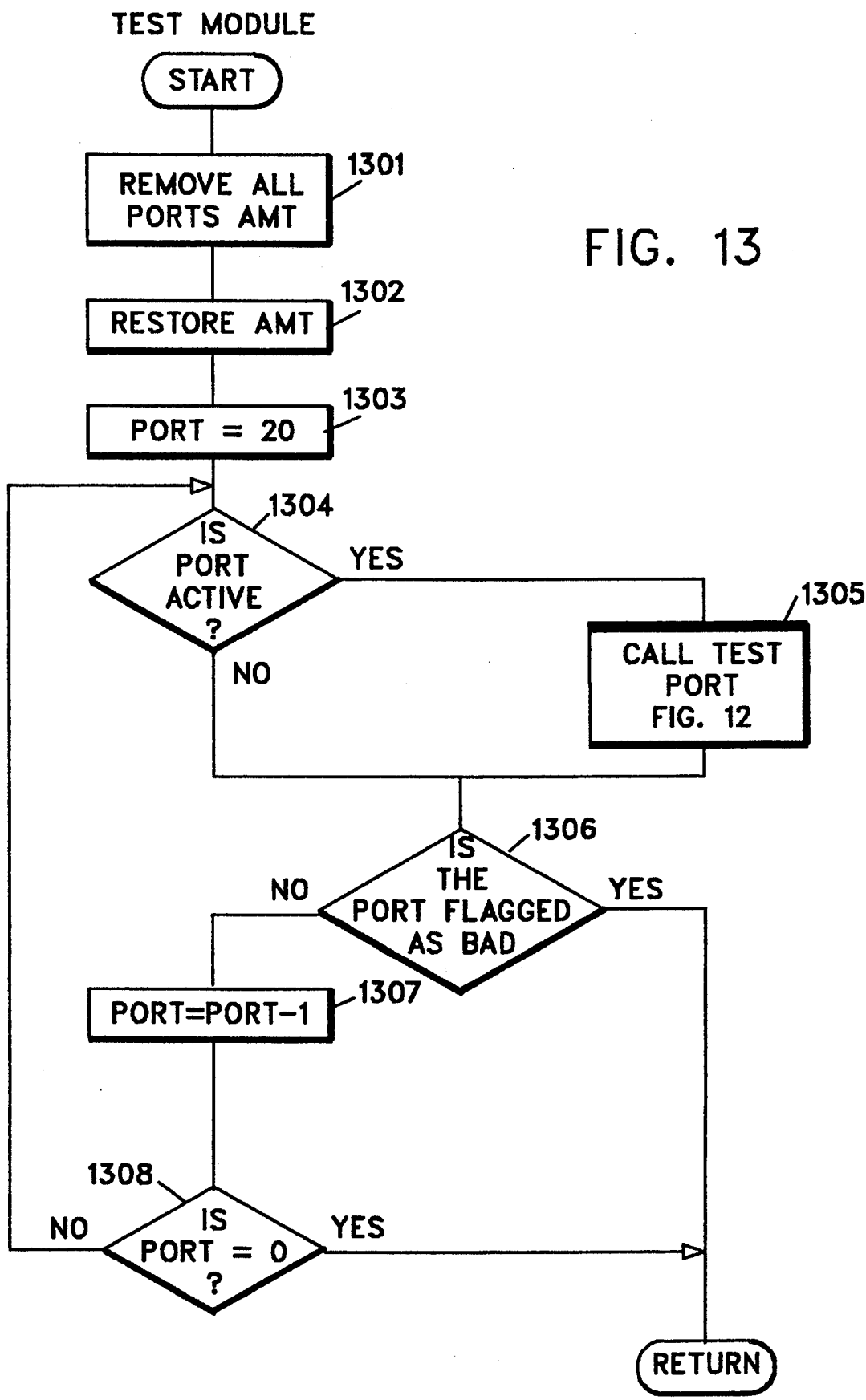

FIGS. 5-17 are flowcharts of the program required in microprocessor 17 for implementing functions described above. More particularly, FIGS. 5-8, when taken as a whole and combined as indicated, define an overall processing routine. FIGS. 9-13 illustrate discrete modules which are called as indicated in the drawings, and FIGS. 14 and 15 are routines which execute when timers expire.

The terms listed and defined below are used in the flow diagrams illustrated in FIGS. 5-17.

T1A, T1B, T2-T6 and RAT (Recover Activate Timer) identify different timers which are set and reset in the flow diagrams.

BNR = Beacon Reconfigure

BNN = Beacon Normal

RR1 = Recovery Required 1 (this state exists when PO is receiving BNN or transmitting BNR)

RR2 = Recovery Required 2 (this state exists when PO is receiving and repeating BNR)

Figure 4D:
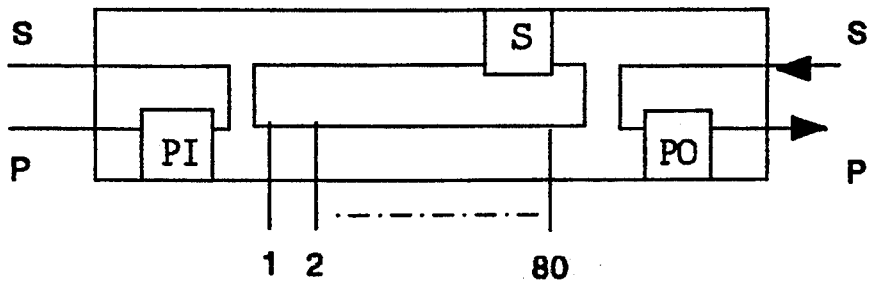

WRAP RI/RO = Switch State FIG. 4D

WRAP RO = Switch State FIG. 4C

WRAP RI = Switch State FIG. 4B

UNWRAP RI/RO = Switch State Change FIG. 4D to 4A

UNWRAP RI = Switch State Change FIG. 4B to 4A or 4D to 4C

UNWRAP RO = Switch State Change FIG. 4C to 4A or 4D to 4B

LM = LAN MANAGER (a program product such as the IBM Network LAN Manager Program, which gathers information relative to operation of the network and issues commands to the devices on the network)

MRO = Merge Ring Out flag (this flag is set to "0" any time the ring in is inoperative)

MRI = Merge Ring In flag (this flag is set to "0" any time the ring in is inoperative)

AMP = Active Monitor Present (A message specified in the IEEE 802.5 Standard)

RF = Recovery Flag

RC = Recovery Counter

NRE = Non-Recoverable Error Flag

NAUP = Next Active Upstream Port

AM = Attachment Module (a segment switch and the attached ports)

AMT = Attachment Module Under Test

In the description of FIGS. 5-17 it will be assumed that the network is configured as shown in FIG. 1 and includes at least three RCUs. If a break occurs between RCUs, one RCU will be immediately downstream of the break on primary ring P, another will be immediately upstream of the break on the primary ring P and all of the other RCUs will be intermediate the two RCUs defined above. If a break occurs between the PI and PO adapters, the RCU detecting the break will assume the reconfiguration switch state illustrated in FIG. 4D and all the other RCUs will be intermediate to the break.

Figure 5A:
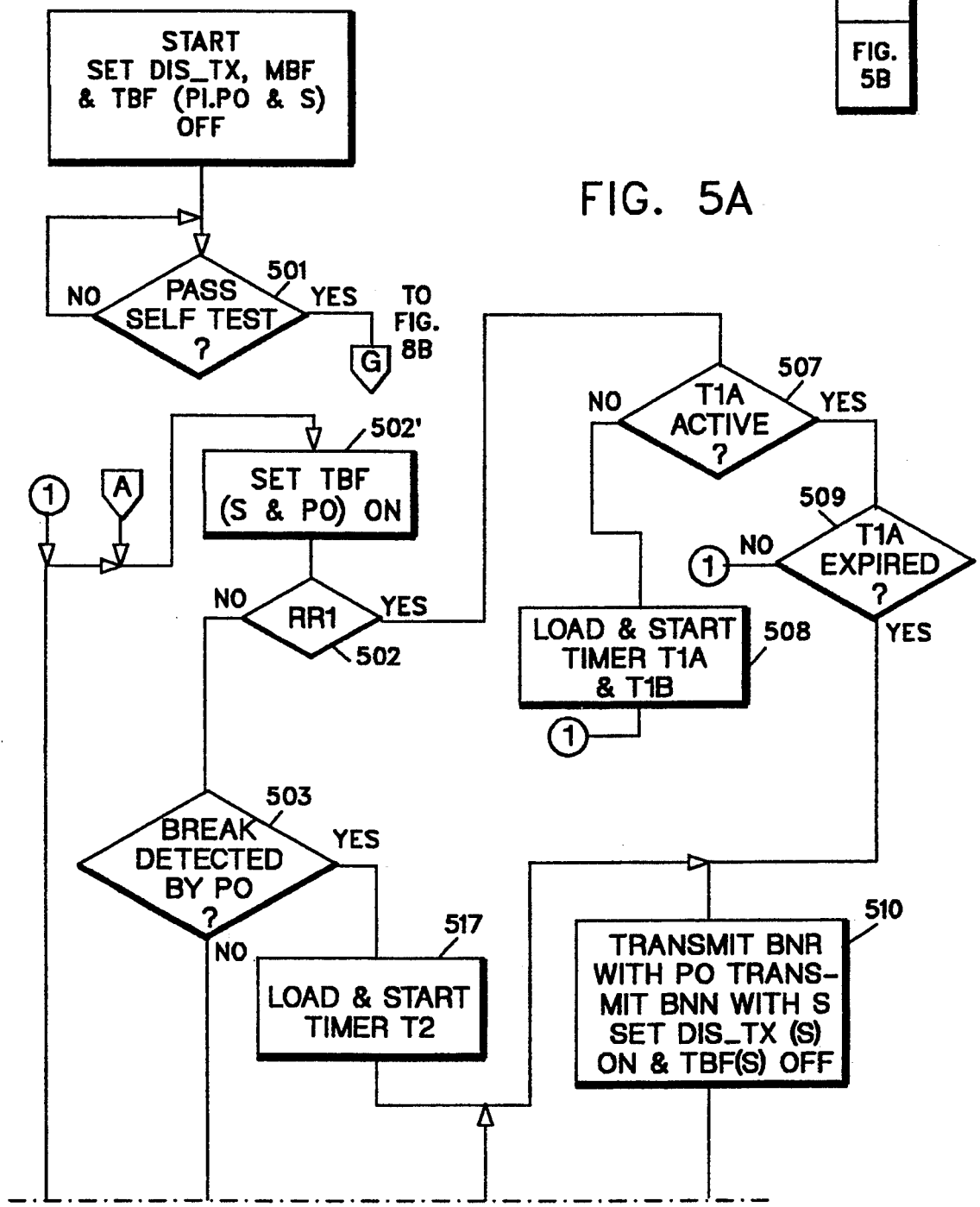
Figure 5B:
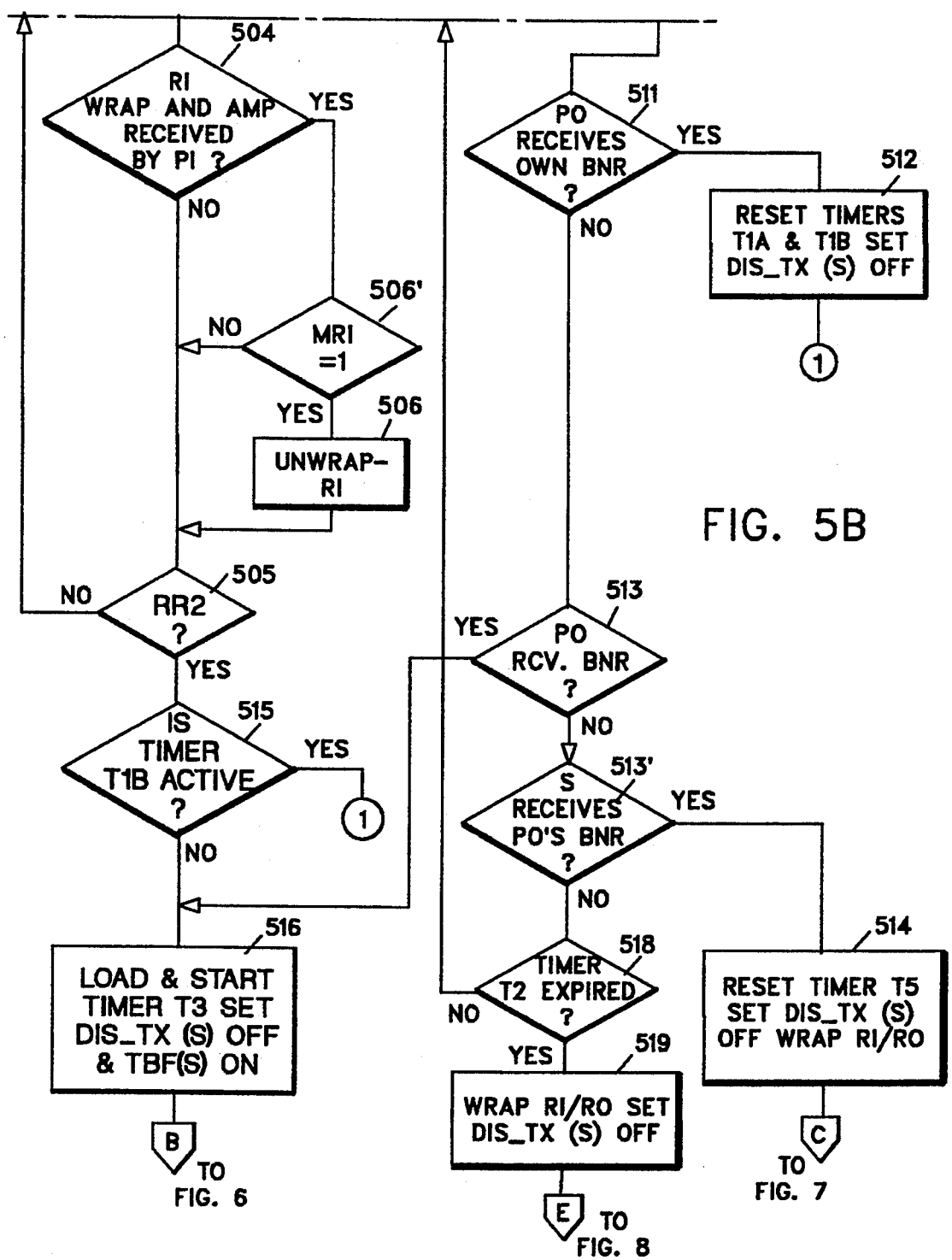
Figure 8A:
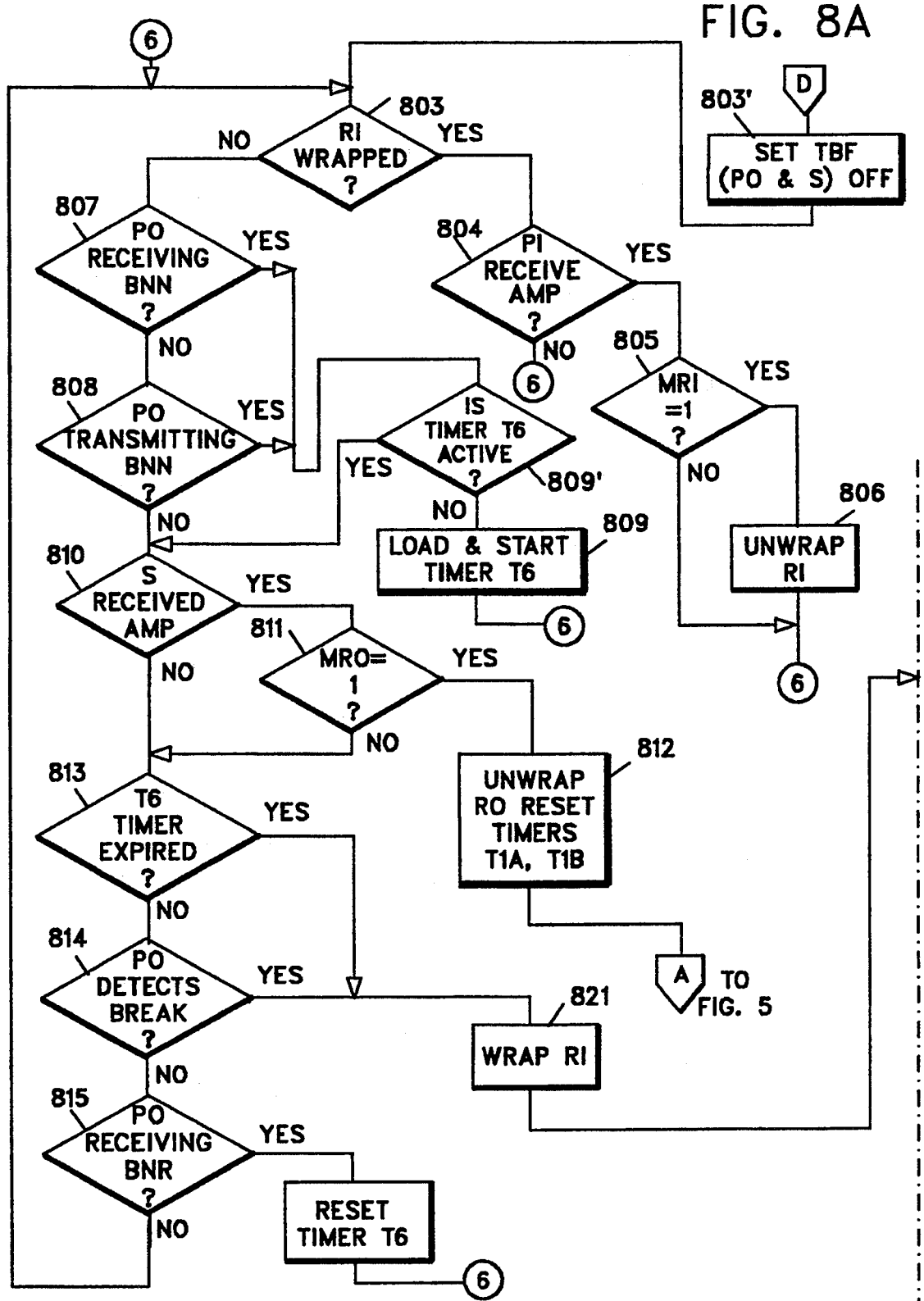
Figure 8B:
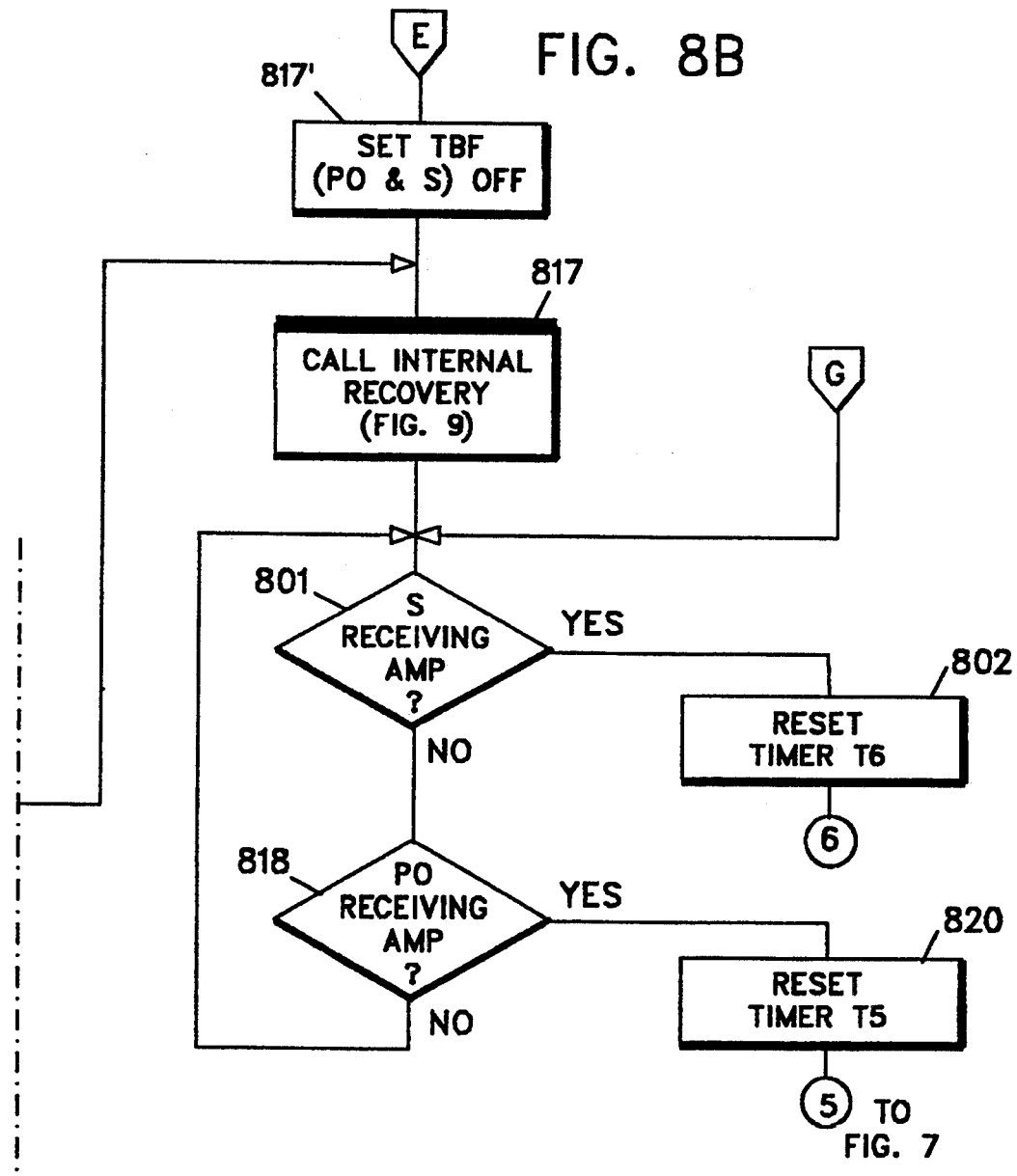

The program is started at power on in FIG. 5. As indicated in the start block, the flag bits DIS_TX, MBF and TBF are set OFF for adapters PI, P0 and S. At this time switch 11 is in the state illustrated in FIG. 4D and the program branches to a subroutine of the main program at (G) FIG. 8B. Assuming there are no failures, the S adapter would have received an AMP frame 801, timer T6 would be reset 802 and the program would branch to 6. Since RI is wrapped 803, MRI=1 804, and PI has received an AMP 805, RI is unwrapped 806.

The program branches back to 6. At this time RI is not wrapped. IF PO is receiving 807 or transmitting 808 a BNN, timer T6 is loaded and started 809 if it is not active 809'. If timer T6 is active it goes to 810; however, RO is assumed operational and the program descends to 810 directly where S has, as previously set forth, received an AMP frame. The RO is operational and MRO=1, 811. RO is unwrapped and timers $T_{1A}$ and $T_{1B}$ are reset 812. The program branches back to A on FIG. 5 where TBF (PO and S) are set on 502' and it loops through blocks 502–505 in the absence of failure in RI, RO or an internal (between PI and PO) failure. At this time the RCU switch state is illustrated in FIG. 4A.

The network can be operating as a dual ring network or as a single ring reconfigured network. It will only operate as a dual ring network when all of the RCUs are powered on and no faults are present. If a single fault exists or if a single or multiple adjacent RCU(s) are powered down a single ring which includes part of the secondary ring is operational. If there are more than one fault or two or more non-adjacent RCUs are powered down two or more independent single rings may be operational. The description below is unaffected by these conditions and will apply to all RCUs which are similarly situated.

If a fault or break takes place on the primary ring, one RCU will be immediately downstream of the break and another will be immediately upstream of the break. Any other RCUs will be located intermediate the upstream and downstream RCUs.

We will first consider the RCU downstream of the break. The PI adapter will detect the break and transmit a BNN and the condition will be communicated to the program. The PO adapter will not repeat the BNN but will transmit a BNR downstream on the primary ring and report this to the program causing it to enter the state RR1; thus the program FIG. 5 will go from block 502 to block 507. In FIG. 5 two recovery required conditions RR1 and RR2 are utilized. RR1 exists when the PO adapter is either transmitting BNR frames or receiving BNN frames and RR2 exists when the PO adapter is receiving and repeating BNR frames. This information is provided to the program by the PO adapter. At this time, timer T1A is not active and timers T1A and T1B are loaded and started 508 and the program returns to 1. The program will wait for timer T1A to expire 509 before proceeding. Once timer T1A has expired, the program sets the DIS_TX bit on and the TBF bit off in the S adapter causing the S adapter to transmit BNN frames and the PO adapter will transmit BNR frames, since its TBF bit had been previously set on and it had received the BNN frames transmitted by the PI adapter 510. If PO receives its own BNR frame 511, timers T1A and T1B are reset DIS_TX(s) is set OFF 512 and the program returns to 1. Since PO received its own BNR, the primary ring is intact and whatever caused the break indication has disappeared.

Figure 6:
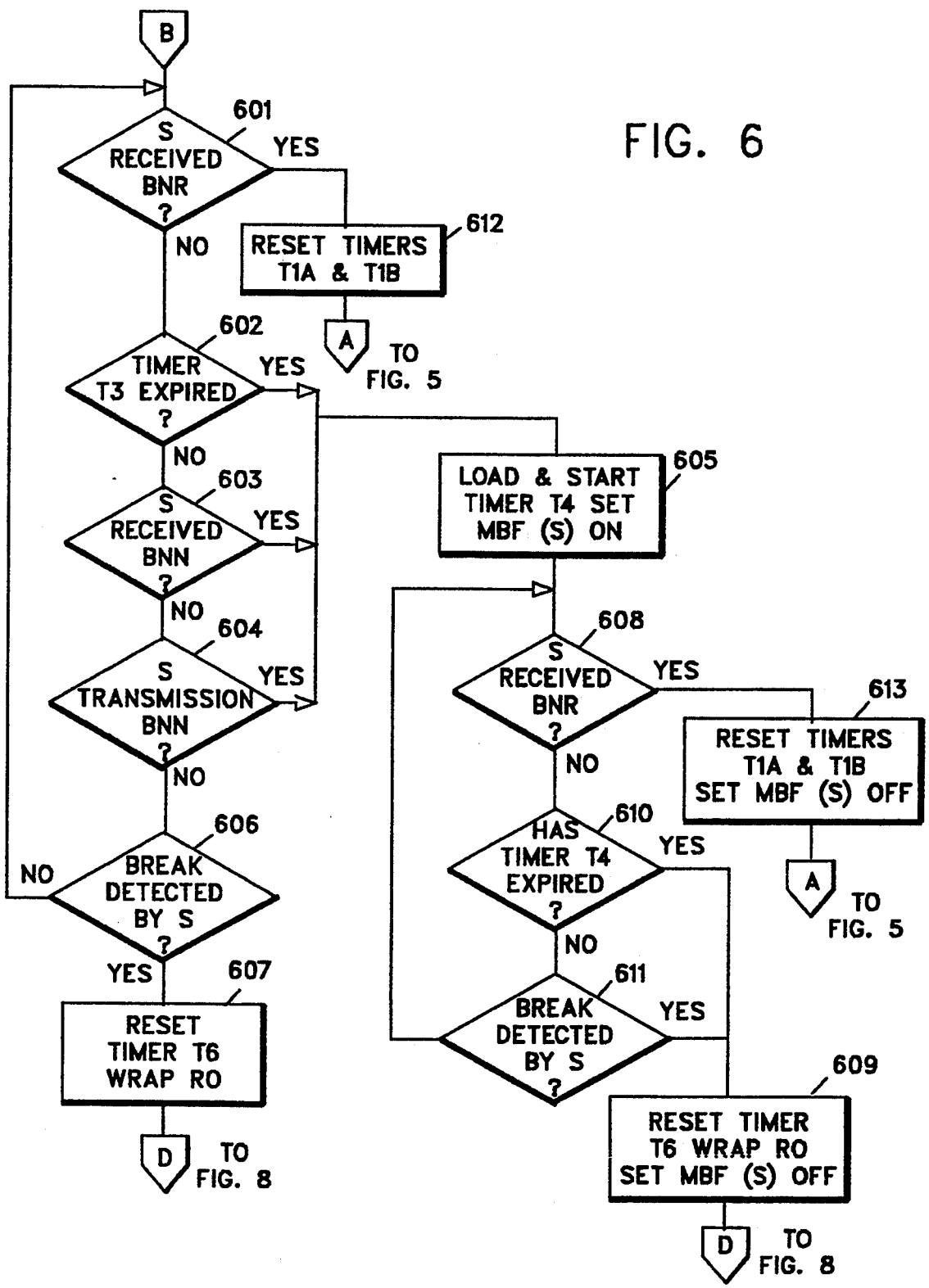

If PO is receiving a BNR from another adapter 513 timer T3 is loaded and started, DIS_TX(s) is turned OFF and TBF(s) is turned ON, 516 and the program branches to B in FIG. 6; however, in the instant example this will not happen and in block 513' the program determines if the S adapter has received PO's BNR. If it has the timer T5 is reset, DIS_TX(s) is turned OFF and ring in (RI) and ring out (RO) are wrapped 514 by changing the reconfiguration switch 11 from the state illustrated in FIG. 4A to the state illustrated in FIG. 4D 514. The program then branches to C on FIG. 7. At this time it executes an internal recovery module 701 and TBF (PO and S) will be set OFF 701'. The internal recovery routine is shown in detail in FIG. 9. The function of this module under the assumed conditions is to check the integrity of the isolated ring which includes the S adapter and all of the active ports controlled by this RCU see FIG. 4D. If, as assumed, no faults exist on the isolated ring, the S adapter will receive an AMP frame 702, the ring out (RO) is operational and MRO equals 1 (703). Ring out (RO) is unwrapped 704 and the reconfiguration switch changes from the state illustrated in FIG. 4D to the state illustrated in FIG. 4B, timers T1A and T1B are reset 705 and the program returns to A FIG. 5.

We will now consider the RCU immediately upstream of the break or fault since the action it takes causes the return of PO's BNR to S at the downstream RCU and the subsequent formation of the single operating ring described above. Turning to FIG. 5 the upstream RCU will have gone through the same power-on self-test previously described for the downstream RCU and the description will start a A of FIG. 5.

Under the assumed condition the program exits blocks 502, 503 and 504 on the negative side. Since the PO adapter is receiving and repeating BNR frames, RR2 is satisfied and block 505 exits on yes (Y). Timer T1B is checked in block 515 and is not active. Timer T3 is loaded and started, the S adapter flag bits are changed 516 and the program branches to B on FIG. 6.

In FIG. 6 block 601 checks if the S adapter received a BNR. If it has timers T1A and T1B are reset and the program branches back to A on FIG. 5. A yes response in blocks 602, 603 or 604 causes timer T4 to be loaded and started and the MBF flag bit in the S adapter set ON 605. If all are negative and the S adapter detects a break 606 timer T6 is reset 607 and the program wraps RO and branches to D on FIG. 8. If any of the conditions specified in blocks 602–604 are satisfied and timer T4 is started, block 608 will for the immediate upstream RCU be negative and the program will wrap RO, reset timer T6, set MBF(s) OFF 609 and branch to D on FIG. 8 if either the timer T4 expires 610 or the S adapter detected a break 611.

After branching to D, the TBF flag bit in PO and S are set to OFF 803' and under the assumed conditions, the program will exit block 803 on the negative side and loop through blocks 807, 808, 810 and 813–815 while it is in the Wrap RO (FIG. 4C) state. While in this loop the program will monitor the input from the S adapter (block 810). When S receives an AMP frame, it indicates that the secondary and primary ring paths between the S adapter of the upstream RCU and the PI adapter of the downstream RCU is operative, MRO will be 1 and it will exit the loop through block 811 and 812 (where RO is unwrapped). It returns to A on FIG. 5 where it will loop through blocks 502–505 and in the absence of any new faults, the program continues to loop through blocks 502–505.

Figure 7:
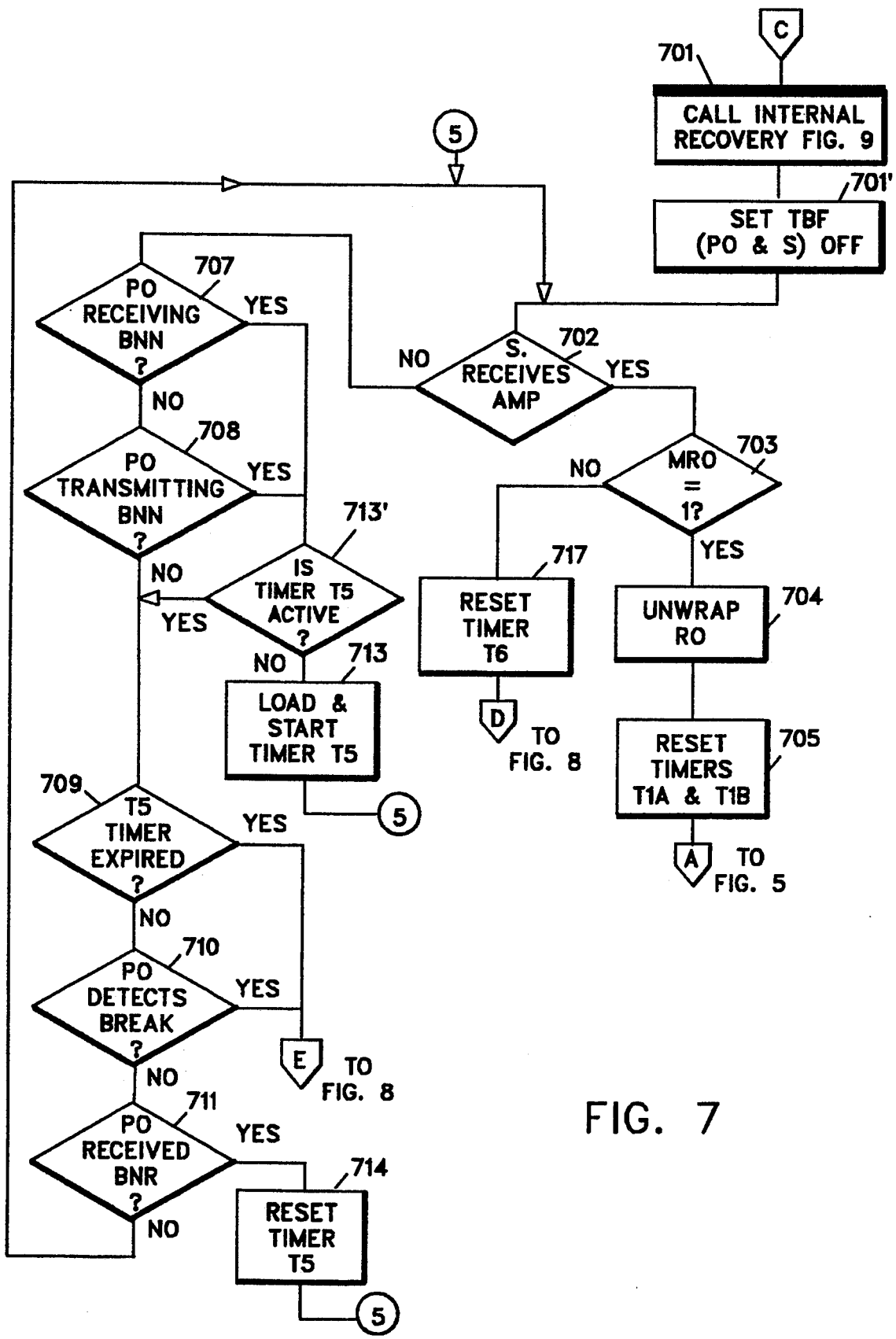

The downstream RCU, as previously described, returns to A in FIG. 5 after unwrapping RO (FIG. 7 block 704). This leaves RI wrapped. While looping through blocks 502–505, it waits for PI to receive an AMP frame 504. When this occurs, it indicates that the fault in the primary and secondary ring between its RI and the upstream RCU's RO has disappeared and if MRI=1 504′, RI is unwrapped in block 506. Since the upstream RCU unwraps its RO under the same condition, S received AMP, the dual ring is now restored.

The RCUs intermediate the upstream and downstream RCUs follow the same path in FIG. 5 as the upstream RCU. In FIG. 6, however, the receipt of the BNR by the S adapter will cause the program in that RCU to go back to A of FIG. 5 after resetting timers T1A and T1B in block 612 or 613 depending on whether it receives the BNR before timer T3 or T4 expire. These RCUs do not change the switch state but remain in the state illustrated in FIG. 4A.

When a PO adapter detects a break, 503, the timer T2 is loaded and started 517 and the program goes into the loop 510, 511, 513′ and 518. If timer T2 expires before PO receives a BNR frame or S receives PO's BNR frame, RI/RO are wrapped, DIS_TX(s) is turned OFF 519 and the program branches to E on FIG. 8. At this time the internal recovery module (FIG. 9) is called 817. This module is used to locate and/or bypass failed components in the isolated ring (FIG. 4D). If the component is bypassed, the S adapter will receive an AMP frame 801 and reset timer T6 802 and go to 6 FIG. 8 as previously described.

If, on the other hand, a successful bypass is not possible, the program will loop through blocks 818, 819 and 801 until either the PO adapter receives an AMP frame 818 in which case timer T5 is reset 820 and the program branches to C on FIG. 7.

Figure 8:
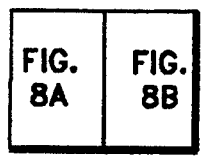

When the program branches to 5 on FIG. 7 from 820 on FIG. 8, RI/RO are wrapped and a non-recoverable error exists on the isolated ring. In this event, S will not receive an AMP frame 702 and the program will loop through blocks 707-711 and 702 pending correction of the faults or if timer T5 expires 709, in which case the program branches to E on FIG. 8. If the program exits blocks 707 or 708, yes Timer T5 is checked to see if it is active 713. If it is not active, it is loaded and started 713 and returns to 5. If timer T5 is active, the program descends to block 709 and proceeds as described above. Timer T5 will be reset in block 714 if adapter PO receives a BNR frame. A branch to E on FIG. 8 will also take place if the PO adapter detects a break 710. In block 703 MRO not equal 1 (i.e. RO inoperative) will reset timer T6 and branch to D on FIG. 8.

Figure 9B:
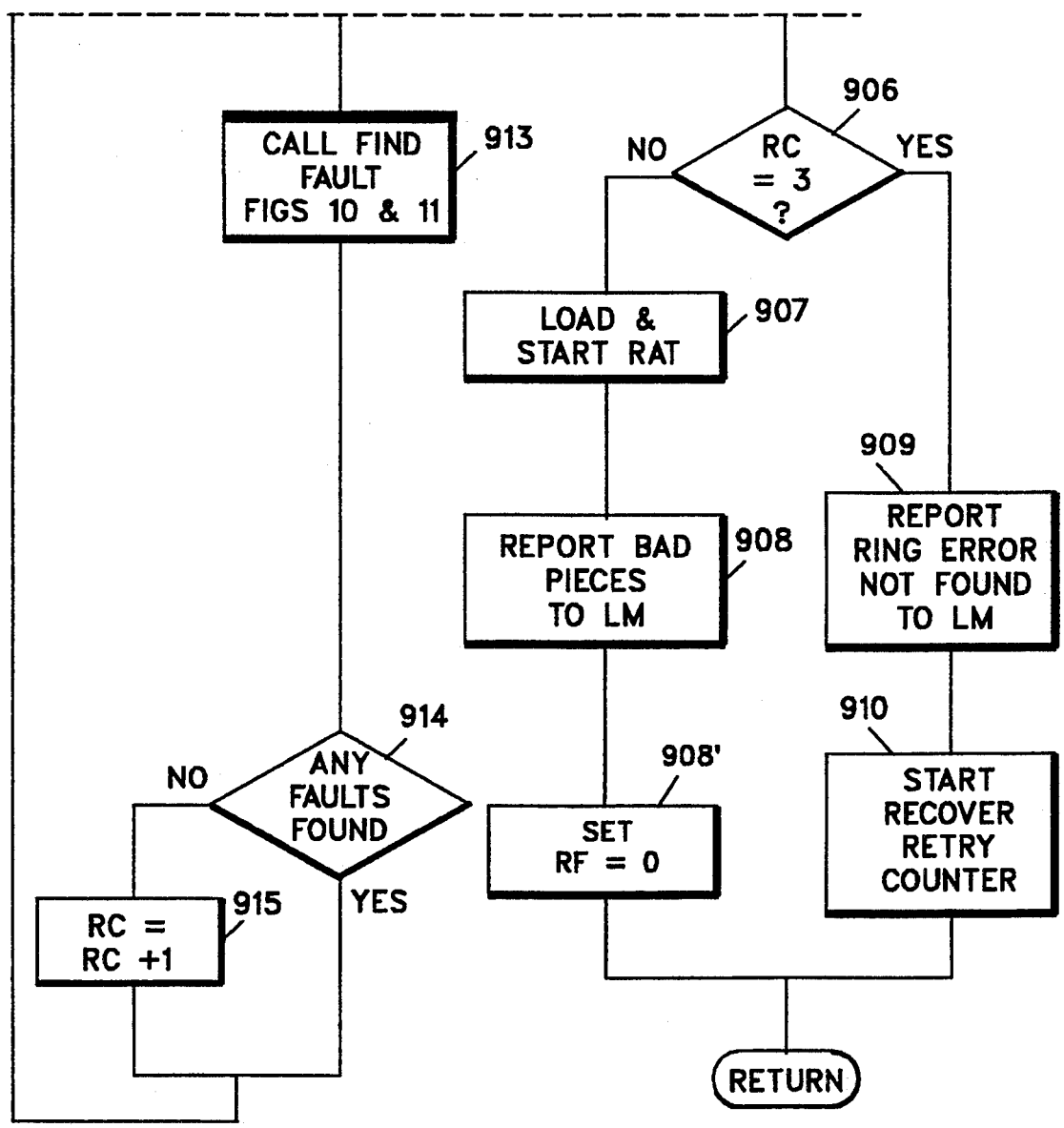

In FIG. 8 if timer T6 expires 813 or the PO adapter detects a break 814, RI is wrapped 821 and the program branches to block 817 to perform an internal recovery routine illustrated in FIG. 9 and proceeds from there as previously described.

The Internal Recovery module illustrated in FIG. 9 is only entered when RI/RO is wrapped (FIG. 4D). In block 901 the recovery flag is set equal to 1. If the RAT timer is active 902, it is reset in block 903 and NRE is set to false in block 904. If the internal ring is recovered 905 (i.e. S receives an AMP frame) the recovery counter value is examined in block 906. If it is not 3, which will be the case if no fault exists on the isolated ring, the RAT timer is loaded and started 907 and any bad pieces are reported 908 to a LAN manager, if resident on the ring 908 and the RF flag is set to zero 908′. The recovery counter RC will only go to three when the fault or error is not found or located, in which case ring error not found is reported 909 and the recover retry counter is started 910. At this time the program returns to the point from which it branched.

If a fault or error exists on the isolated ring, the program will descend through blocks 911 and 912 since NRE is false and RC is assumed to be zero at this time. The recover counter, RC, is reset to zero when the RAT timer expires, see block 1501 in FIG. 15. This counter is used to prevent oscillations when a fault is not found while the ring is isolated but reoccurs as soon as reconnection takes place. The counter limits this to three tries. At this time the program calls Find. Fault 913.

Figure 10B:
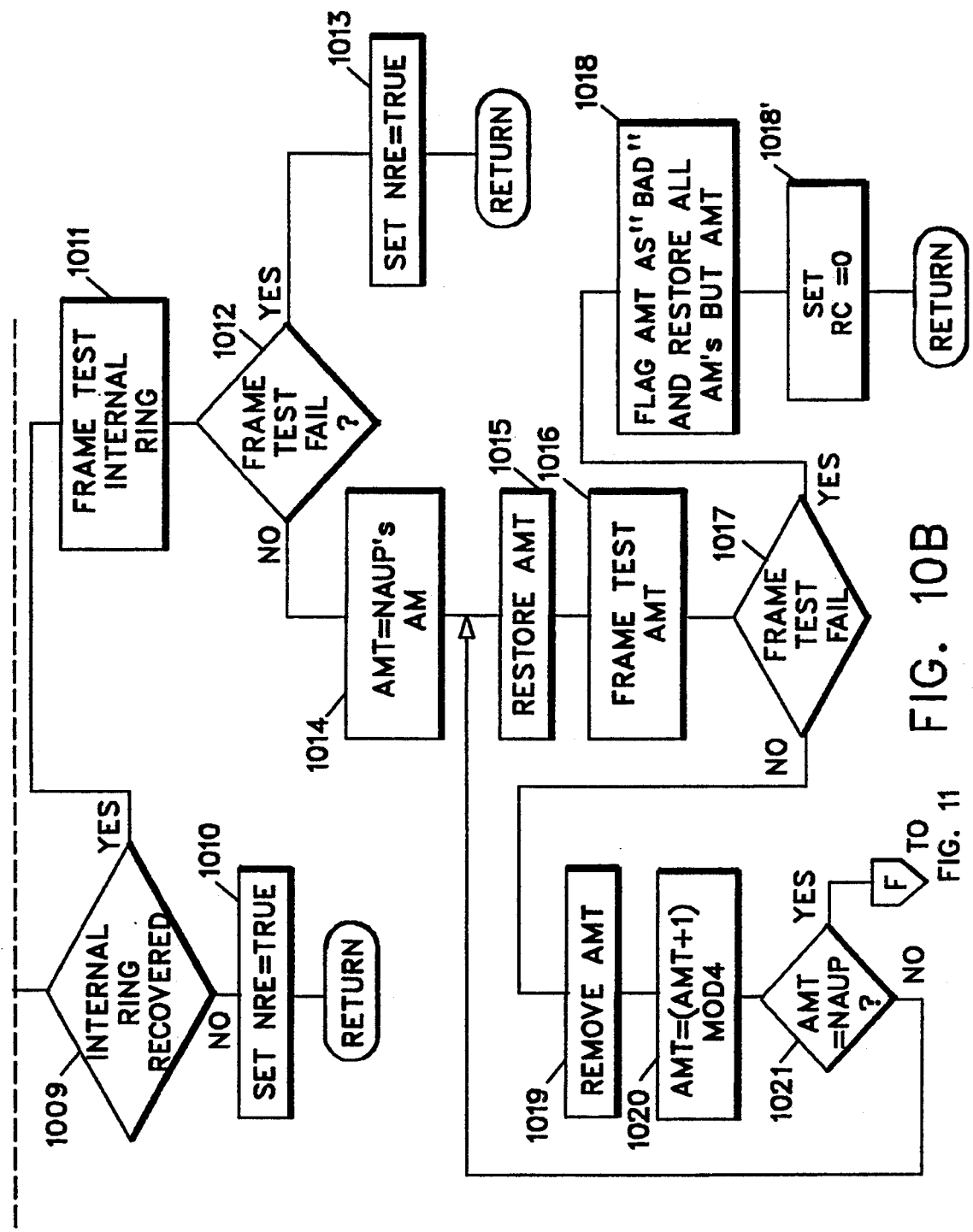

Find Fault, FIG. 10 is initiated with an 18 second wait 1001. If the internal ring is recovered 1002, the program returns to block 914 on FIG. 9. Since no faults were found, RC is incremented by 1 in block 915. If any ring components had been deactivated (bypassed) that information would be saved in block 916. Under these circumstances the program would return through blocks 905, 906, 907 and 908.

If the internal ring has not recovered in block 1002, the more typical situation, the Next Active Upstream Port (NAUP) is removed 1003. The NAUP is the first active port upstream of the beacon transmitter and generally is the port to which the NAUN is connected. The identity of the NAUN is supplied by the beaconing device and the program correlates that identity with the port as described in detail below. If the internal ring recovers 1004, the program calls Test Port (1005) FIG. 12.

Test Port (FIG. 12) restores the port, the NAUP's port, in this case 1201. If the internal ring fails 1202, the port is removed 1203, flagged as BAD 1204 and the program returns to 914 where it exits yes and continues as previously described.

If in FIG. 10 the ring does not recover (1004) the port to which the beacon transmitter is connected is removed 1006. If the internal ring recovers 1007, Test Port 1005 is called. If it fails to recover, all of the attachment modules are removed 1008. If the internal ring fails to recover 1009, NRE is set to True 1010 and the program returns to 914 and exits 914 on the yes leg, since a fault has been identified (i.e. the S adapter or above).

When the internal ring is recovered in 1009, a test frame is transmitted 1011 and if the frame test fails 1012, NRE is set to True 1013 whereupon the program returns to 914 and proceeds from there as previously described.

If the test frame does not fail, AMT is set to the NAUPs AM 1014 and the AMT is restored 1015. A frame test of the AMT is performed 1016. If the frame test fails 1017 the AMT is flagged as bad and all AMs but the AMT are restored 1018 and the RC flag is set to zero 1018′. The program returns to 914 and proceeds as previously described. When the frame test 1017 does not fail, the AMT is removed 1019, the AMT is incremented by 1 modulo 4 (or n where n is equal to the number of AMs) 1020 and the new AMT is examined 1021 to determine if it is the NAUP's AMT. If it is not, the program loops through 1015, 1016, etc.

Figure 11:
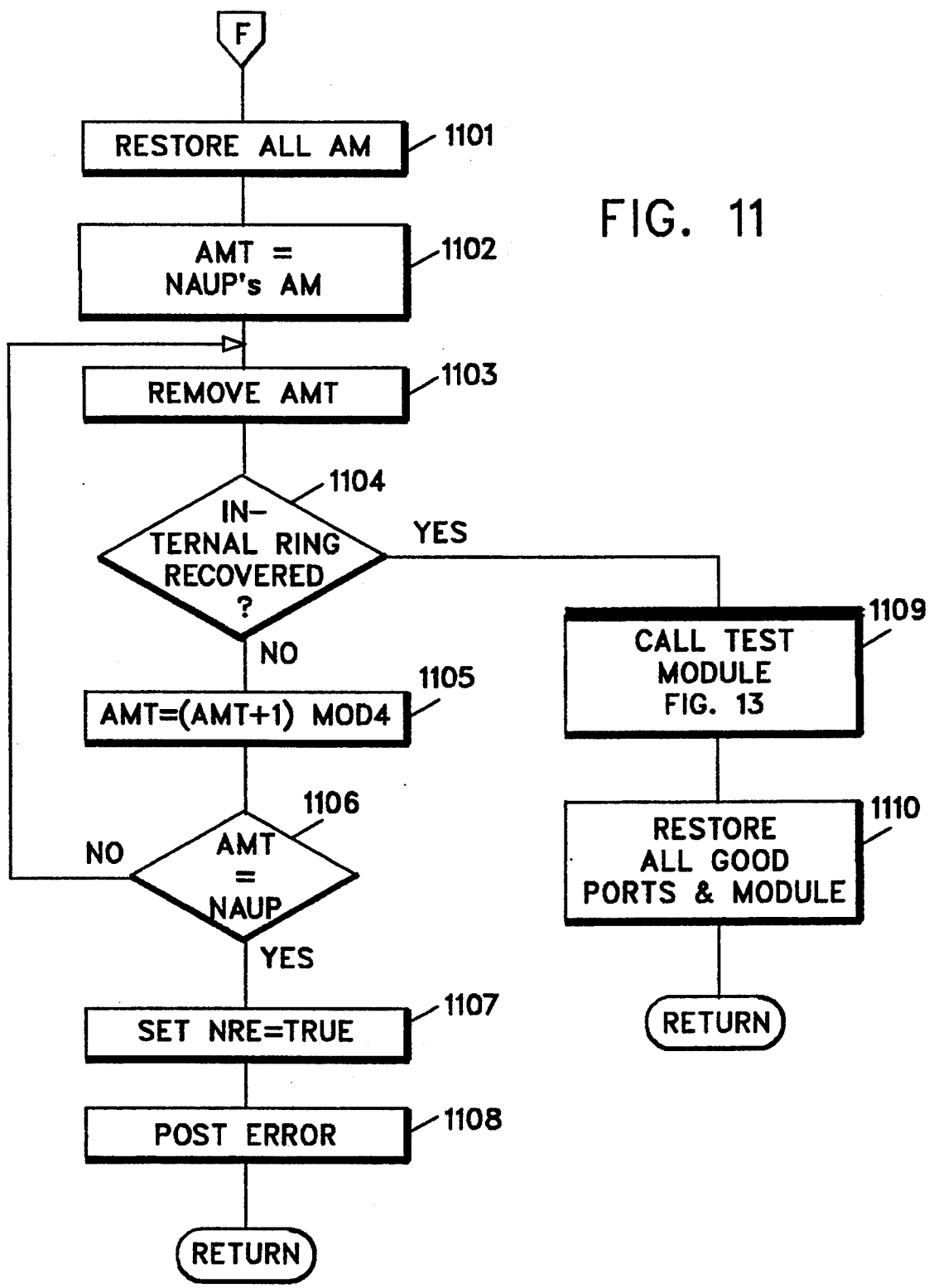
Figure 12:
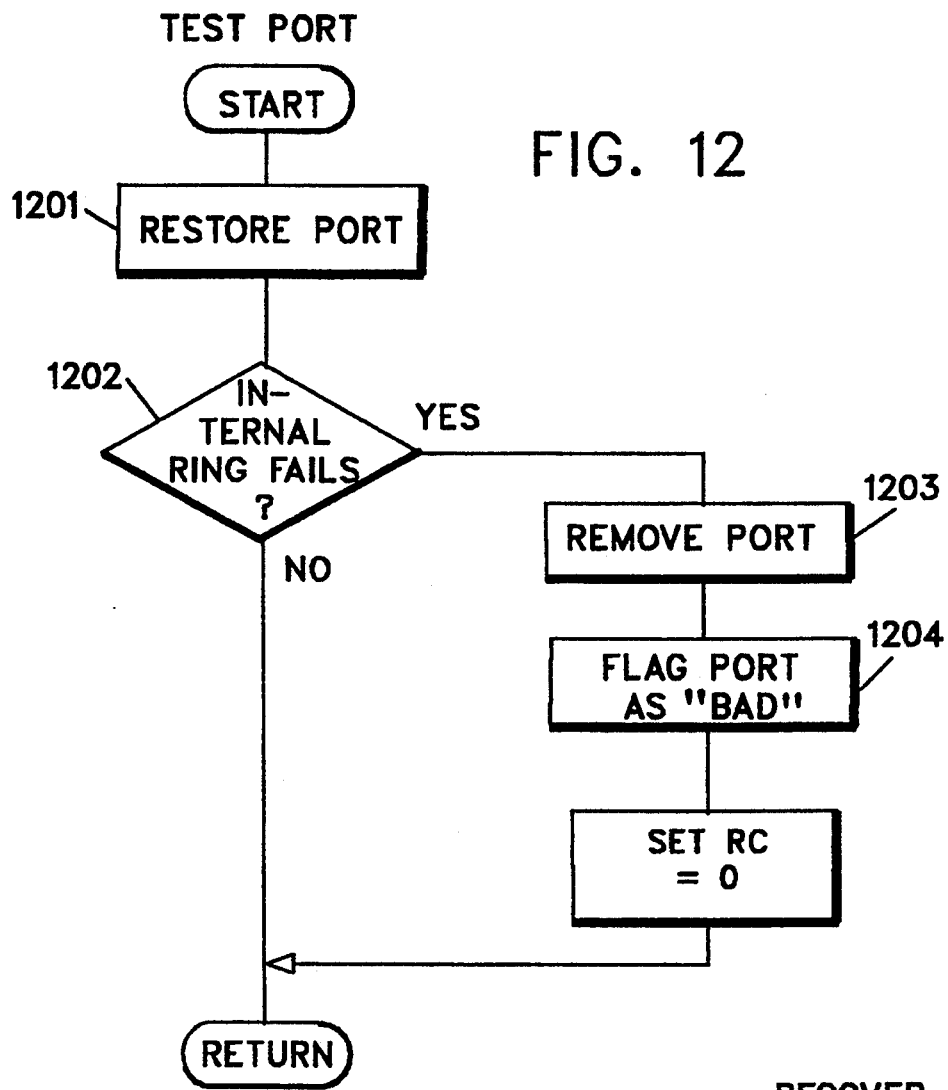

When the AMT 1021 is the NAUP's AMT this indicates that all AMs have been through the loop without a frame test failure being detected at 1017 and the program branches to F in FIG. 11 where additional testing takes place.

In FIG. 11 all of the AMs are restored 1101, AMT is set to equal the NAUP's AM 1102 and the AMT is removed 1103. If the internal ring does not recover 1104, the AMT is incremented by 1 modulo 4 1105 and the AMT is examined to see if it is the NAUP's AMT 1106. If it is not, the program loops through 1103-1106. If the internal ring does not recover after all the AMs have been removed, NRE is set to true 1107, the error condition is posted 1108 and the program returns to 914.

If the internal ring recovers 1104 the program calls Test Module (FIG. 13) 1109. In Test Module (FIG. 13) all of the ports on the AMT are removed 1301, the AMT is restored 1302 and port 20 (or n where n is the highest numbered port) is restored 1303. If this port is active 1304, the Test Port Module (FIG. 12) previously described is called and executed 1305. If the port is flagged as bad 1306 the program returns to 1110 on FIG. 11 where all of the good ports and modules are restored and then returns to 914. If on the other hand the port was neither active 1304 or bad, the port number is decremented by 1 1307 and if the port number is not 0 1308 the program loops back to 1304. When the port number equals 0 the program returns to 1110 on FIG. 11.

The Recovery Retry Timer Expired Module FIG. 14 regulates the number of times and the frequency of the attempted recoveries. As previously described, the timer is started in block 910 of FIG. 9 when the ring error is not found. Thus another attempted recovery must await the expiration of the timer. Once the timer has expired, RC is set to 2 1401 (FIG. 14) and RF is set to 0 in 1402. If the internal ring fails 1403, internal recovery 1404 (FIG. 9) executes as previously described. If it does not fail, Ring Error Not Found is cleared 1405 and RC is set to 0 in 1406.

Figures 16, 16A:
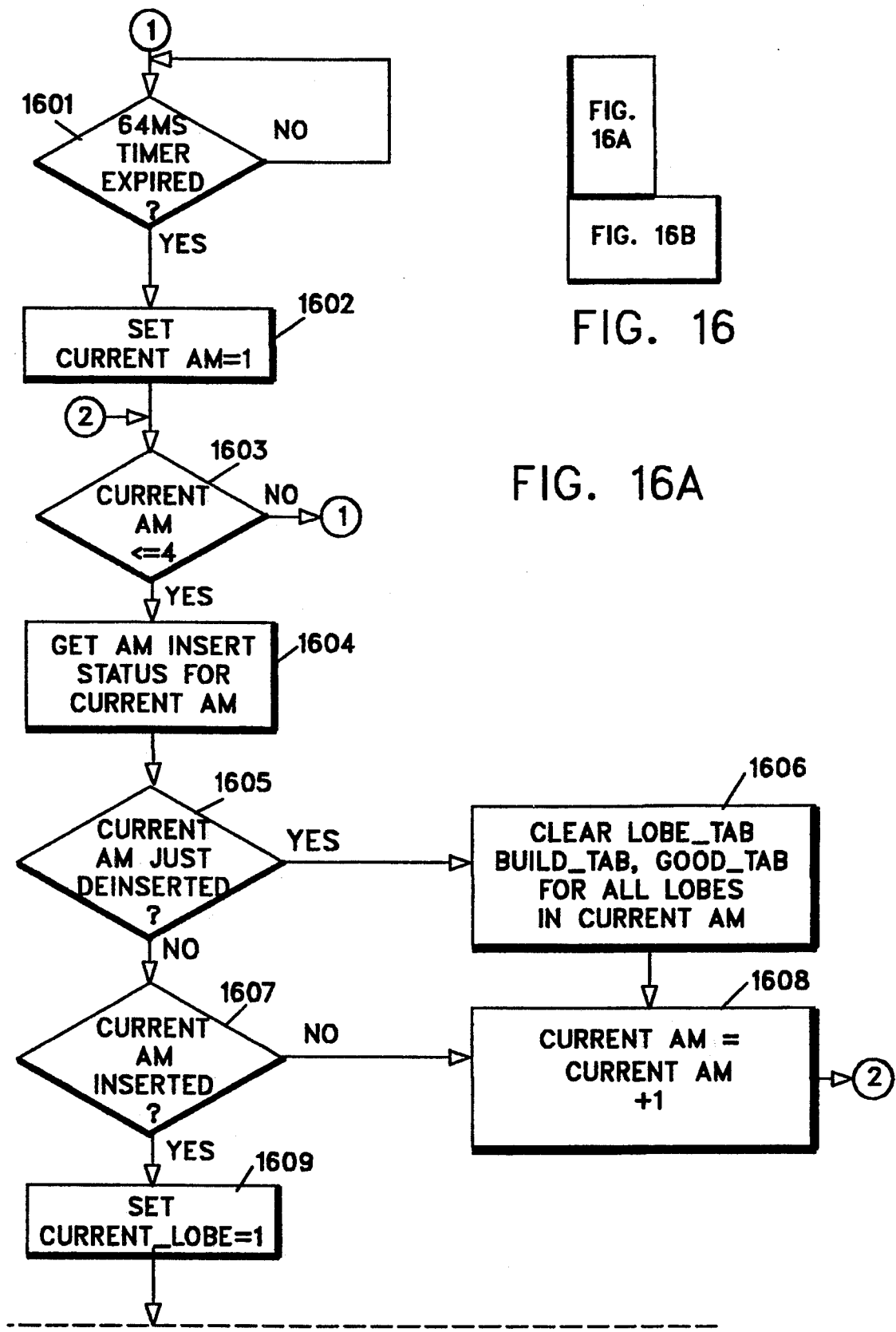
Figure 16B:
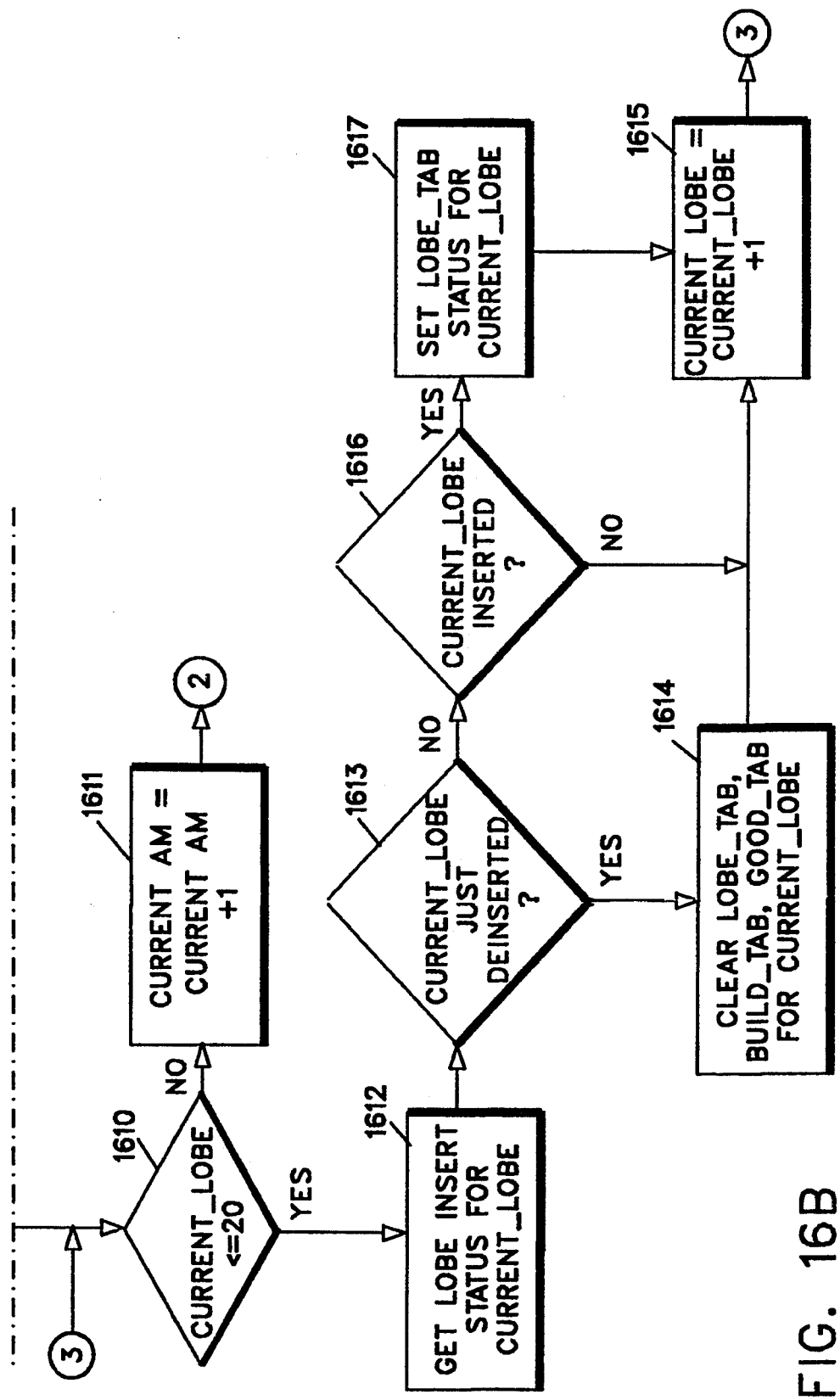
Figure 17B:
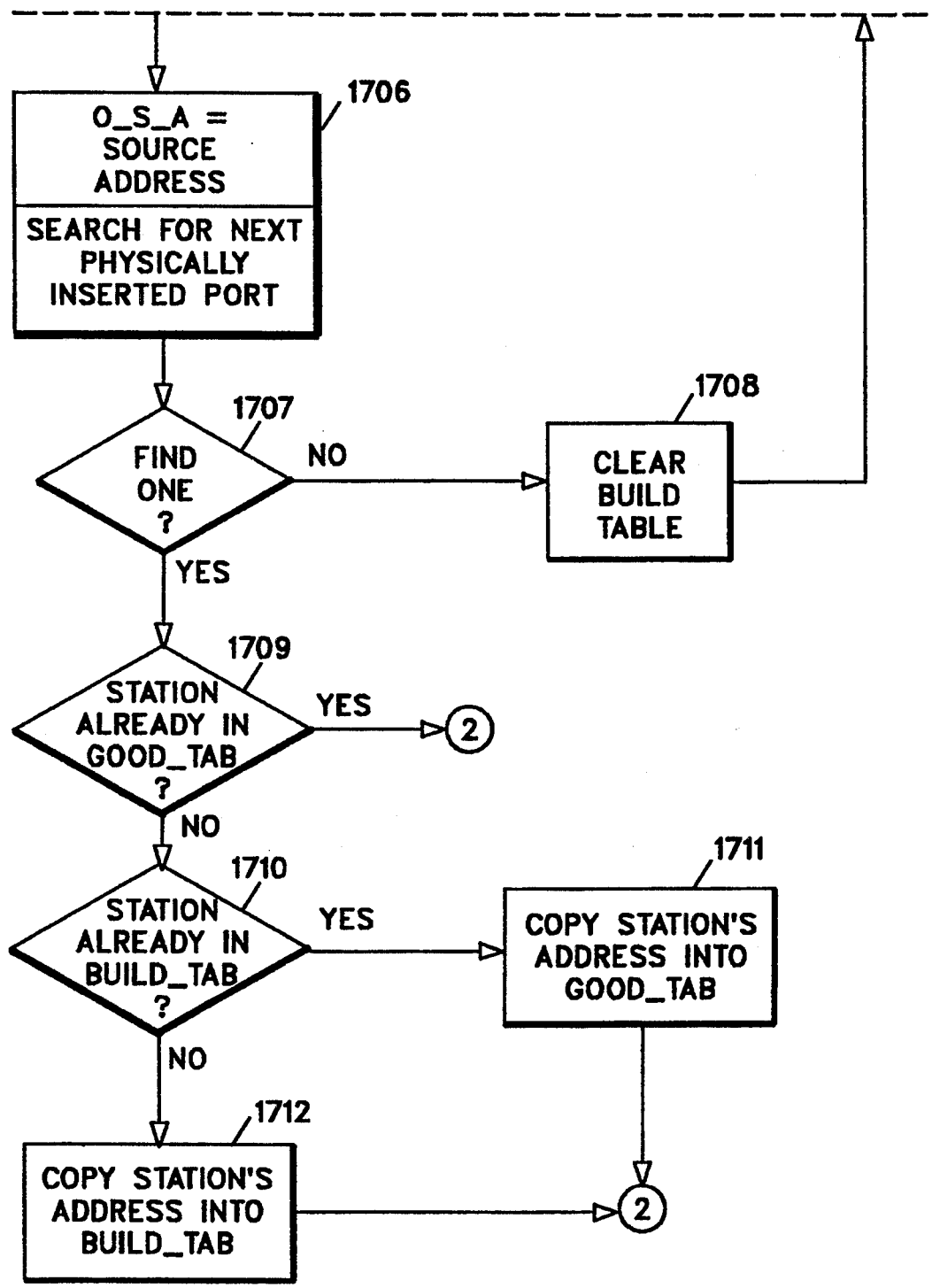

The flow diagrams illustrated in FIGS. 16 and 17 define the program modules which correlate the ports to the specific terminals or devices connected to the lobes or wires connected to the ports whereby the programs can create tables which identify the specific port or lobe to which each terminal or device is connected without any additional equipment or specific reporting by the connected devices.

The program maintains the four tables listed below which are relevant to the modules illustrated in FIGS. 16 and 17:

1. Lobe or Port Table
2. Station Build Table
3. Station Good Table
4. Attachment Module or Segment Table The Lobe or Port Table includes the status (inserted/deinserted) of each port and is maintained by monitoring the d.c. or phantom current provided by the stations or terminals wanting access to the network. In the absence of any unique requirements, the program will enable all of the ports and the presence of the d.c. current from a station will insert the port in the series circuit. In addition, the program via bus 18 is informed that the port is active and marks the Port Table entry corresponding to that port as inserted. In a like manner, if the d.c. current is removed, the port is bypassed and the corresponding entry for that port in the table is marked deinserted. In addition, if as previously described, a port is bypassed or inserted the table is updated to indicate the status of the port. The Attachment Module (AM) or Segment Table is similar and includes the status (inserted/deinserted) for each of the four Segments or Attachment Modules which are under control of the processor as previously described.

In addition, the program maintains a Station Build and a Station Good Table. Each of these tables includes the address or identity of the station connected to each lobe or port. When the program first recognizes a station connected to a port, the station identity is inserted into Build Table and upon a subsequent recognition, the station identity is entered into the Good Table. The information in the Good Table is considered reliable and is used for network management.

FIG. 16 illustrates an interrupt routine for maintaining the insert status of the AMs and their ports and is executed every 64 MS 1601. When the timer expires, the current AM is set equal to 1 1602 and if the current AM is less than or equal to 4 (since there are 4 AMs) 1603 the program gets the current AM insert status from the AM Table 1604. If the current AM has just deinserted 1605, the program clears the Lobe and Build Tables and changes the insert status in the Good Table for all of the ports connected to the AM 1606.

If the current AM has not just deinserted, it checks the AM Table to determine if it is inserted 1607. If it is not inserted, the current AM value is incremented by 1 1608 and the program loops back to 2 where the above steps are repeated for the next AM. When the current AM is inserted, the current lobe or port is set to 1 1609 and the program enters a loop to maintain the insert status of the twenty ports or lobes connected to the current AM.

In block 1610 the program checks to see if the current lobe is less than or equal to twenty (20). If it is not, this indicates that all ports in the current AM have been maintained and the current AM is incremented by 1 in block 1611 and the program returns to 2 to process the next AM provided the next AM is equal to or less than 4 in block 1603. When the current lobe is twenty or less, the program gets the current lobe insert status from the Lobe/Port Table 1612 and checks to see if it has been just deinserted 1613. In order to make this determination, the table includes the past history of the last three status changes or states (eg. 110 or 100 where 1=inserted and 0=deinserted). If the lobe has just deinserted the program clears the Lobe and Build Tables and changes insert status for the port in the Good Table for the current lobe 1614 and increments the Current Lobe by 1 1615 and then returns to 3 to process the tables for the next lobe.

If the lobe has not just deinserted, the lobe Table is checked 1616 to see if it is inserted. If it is the Lobe Table status for the current lobe is updated 1617 and the current lobe is incremented by 1 1615.

FIG. 17 is a flow chart of the program module which handles ring poll frames or messages. As previously described, the ring poll frame includes the address or identity of the source and the address or identity of the next active upstream neighbor station (NAUN), however, it does not include any information as to which ports or lobes these two stations are connected to. This module generates the build and good table which correlates the sequential addresses or identities with the inserted or active ports or lobes.

Each of the adapters 10, 15 and 16 provides the processor 17 with a copy of ring poll frames which it generates and adapter 16, in addition, provides a copy of all ring poll frames regardless of source to the processor 17. The program module starts at 1 and examines copies of ring poll frames received over the bus 19. If the source of the frame is the ring in adapter 10/16 (depending on the current configuration of the switch 11, see FIGS. 4A–C) the program will exit block 1701 on the yes leg; otherwise it will loop. In the description which follows, the adapters will be referred to as ring in or ring out media access control (MAC) in accordance with prevalent practice in this technology. When a ring poll frame from the ring in MAC is received, the program sets a variable O.S.A. (Old Source Address) equal to the source address of the ring in MAC 1702. The program waits for a received frame in 1703 and when one is received, the NAUN addresses are compared 1704. When they compare the frame is a properly sequenced ring poll frame and the source address is compared with the ring out MAC address 1705.

When the source address does not equal the ring out MAC address 1705, the O.S.A. is set equal to the source address of the frame and a search is made for the next inserted port 1706. If one is not found 1707 the Build Table is cleared 1708 and the program returns to 1, since this is a clear error condition and any new information in the current ring poll cycle is not reliable. If one is found, the Good Table is checked 1709 for the source address and if there no further action is required and the program goes back to 2.

When the source/station address is not found in the Good Table, the program checks the Build Table 1710 and, if the source address is in the Build Table, the address is copied into the Good Table 1711 and the program goes back to 2 to process the next received frame. When the station address is not found in the Build Table 1710, it is copied into the Build Table 1712 and the program returns to 2.

If the source address equals the ring out MAC address 1705, the program searches for the next physically inserted port 1713. If one is found 1714, an error condition is indicated and the Build Table is cleared 1715 before the program returns to 1 where it waits for another ring poll cycle to start. When no additional inserted ports are found 1714, this indicates a successful completion of the current ring poll cycle and the program returns to 1 to await another. Blocks 1707 and 1714 detect, respectively, under and over mismatches between the number of inserted ports and the number of ring poll frames received between the ring in MAC and the ring out MAC addresses.

Figure 18:
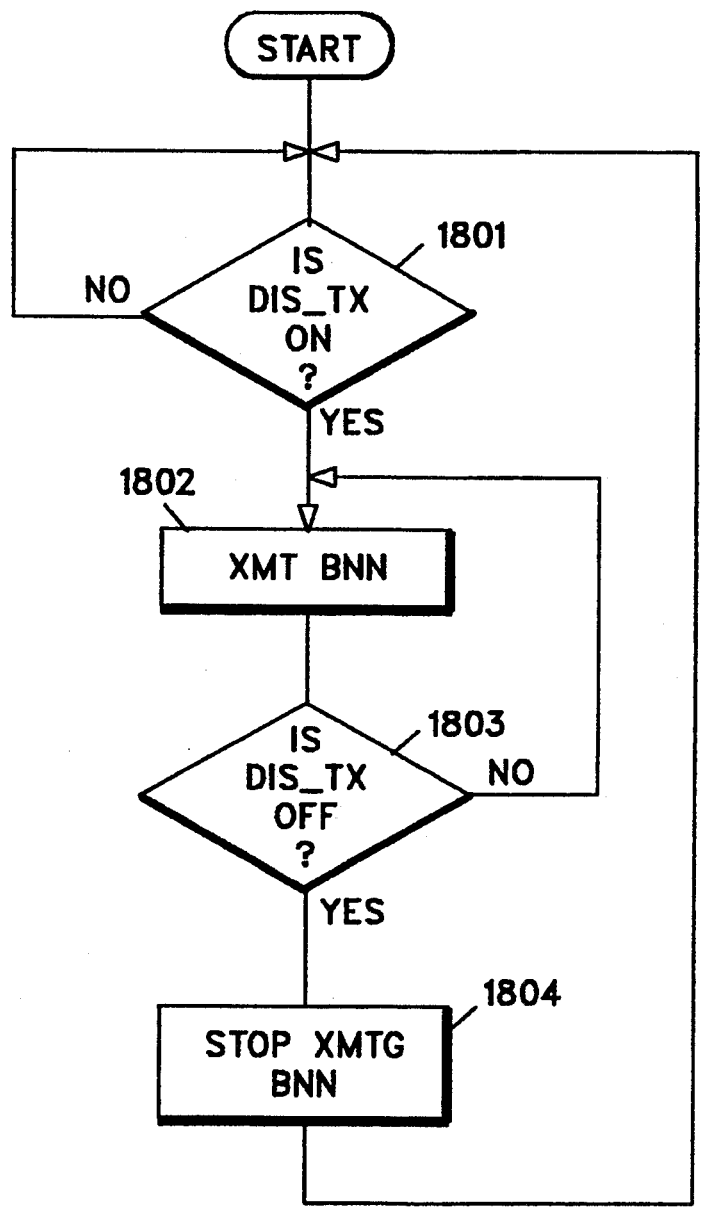
Figure 19:
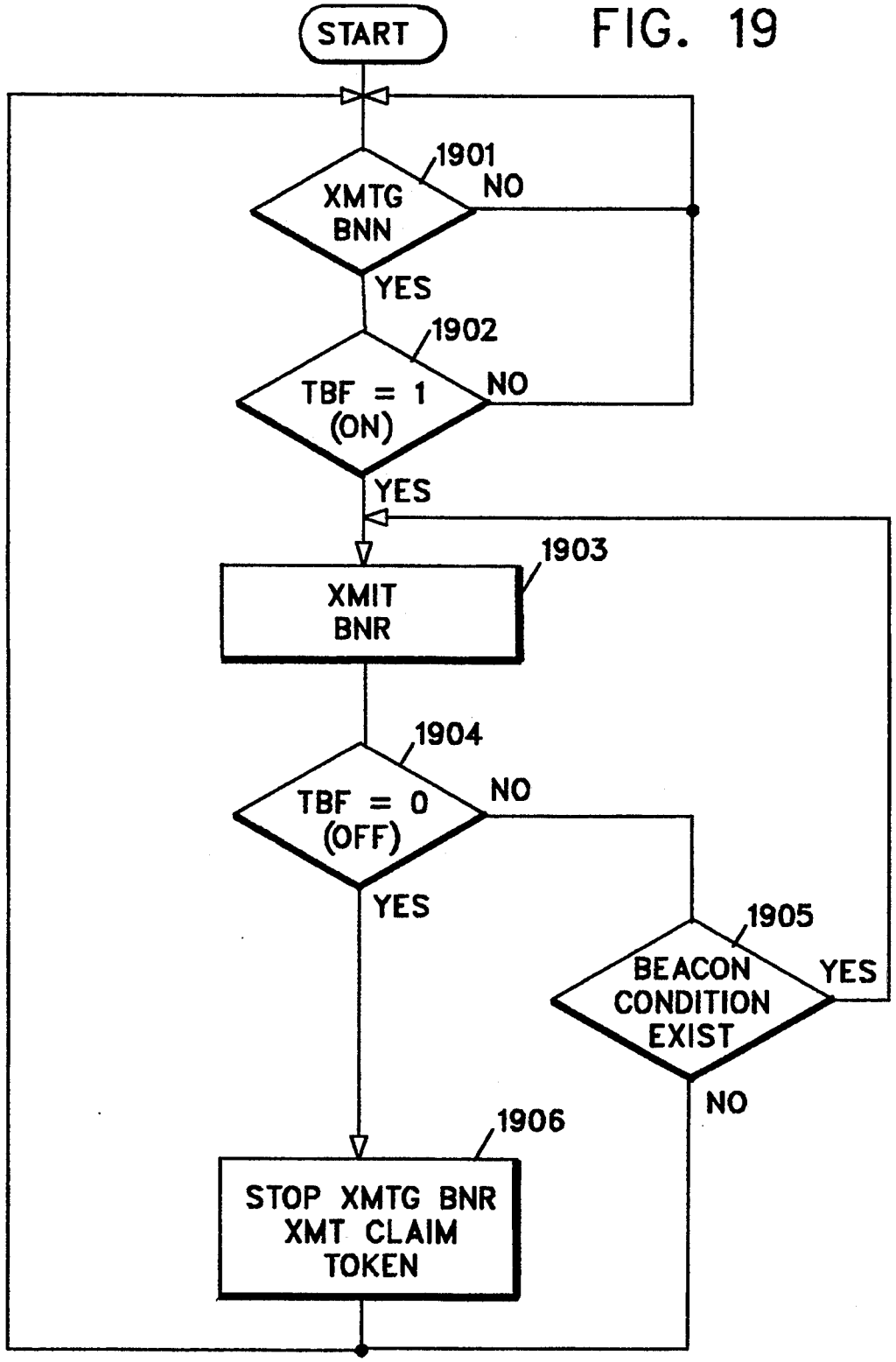
Figure 20:
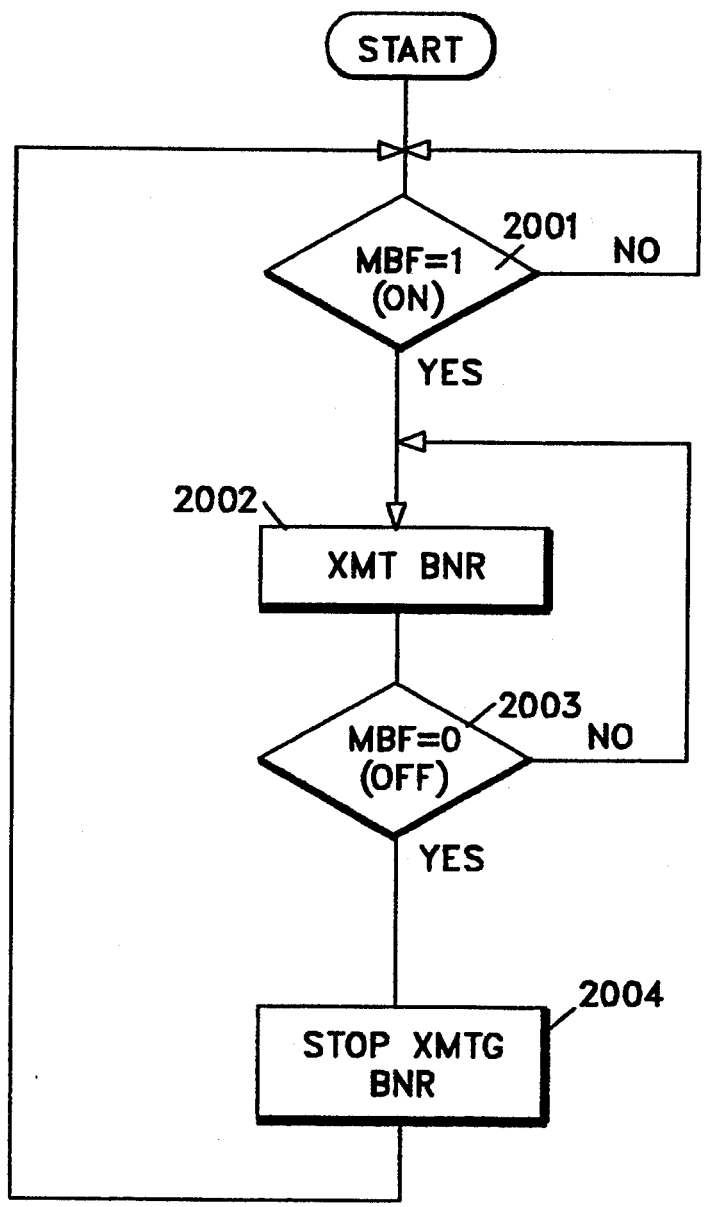

FIGS. 18–20 are flow diagrams of the addition code required in adapters 10, 15 and 16 (PI, PO and S, respectively) to respond to the additional flag bits added to those currently used in the IBM Token Ring Adapter. The flag bits are transmitted by the processor 17 over the bus 19 and are set "on" and "off" as previously described in FIGS. 5–8.

When DIS_TX is set on FIG. 18, 1801 the adapter transmits (XMT) a Beacon Normal (BNN) frame 1802. If DIS_TX is turned off 1803, the adapter discontinues transmitting (XMTG) Bnn frames 1804 and returns to Start. If DIS_TX is not turned off, it continues transmission of BNN frames.

In FIG. 19 if the adapter is transmitting a BNN 1901 and the TBF flag is on 1902, it will transmit a BNR frame 1903. If the TBF flag is not off 1904 and the beacon condition still exists 1905, it will loop and transmit BNR. If TBF is off 1904, the adapter will discontinue transmitting BNR 1906 and transmit the standard IEEE 802.5 claim token frame 1906 and return to start.

In FIG. 20 if the flag bit MBF is on 2001, the adapter will transmit a BNR frame 2002 and continue to do so until as long as MBF is on; however, when MBF is turned off 2003, the adapter will stop transmitting BNR frames 2004 and return to start.

The foregoing and other features and advantages of the invention will be apparent to those skilled in the communication art.

We claim:

1. A reconfiguration unit for attaching to a dual ring network which includes a primary ring (PR) carrying signals in a first direction and a secondary ring (SR) carrying signals in a second opposite direction and for selectively interconnecting said PR and SR when signal transmission in the dual ring network is impaired comprising:

a plurality of station access ports for attaching terminal devices;

a first and second input for receiving signals from said PR and SR respectively;

a first and second output for transmitting signals on said PR and SR respectively;

first, second and third adapter means for selectively receiving signals from the network, retransmitting signals and generating signals;

first switching means operatively coupled to the station access ports, said first switching means selectively connecting at least one station access port to said network;

a programmed processor connected to said first, second and third adapter means for receiving the signals therefrom and generating control signals related thereto; and a second switching means connected to said first and second inputs and outputs, said first, second and third adapters and said first switching means; said second switching means receiving the control signals and interconnecting selected ones of said first and second inputs and outputs, said first, second and third adapters and said first switching means so that the dual ring network is reconfigured into one of a plurality of reconfigurable states.

2. A reconfiguration unit as set forth in claim 1 in which said second switching means in response to a first control signal from said programmed processor connects said first adapter means, said at least one port and said second adapter in series between the first input and the first output; and connects the second input, said third adapter and the second output in series.

3. A reconfiguration unit as set forth in claim 1 in which said second switching means in response to a second control signal from said programmed processor connects said third adapter means, said at least one port and said second adapter means in series between the second input and the first output; and connects the first input, said first adapter and the second output in series.

4. A reconfiguration unit as set forth in claim 1 in which said second switching means in response to a third control signal from said programmed processor connects said first adapter means, said at least one port and said second adapter means in series between the first input and the second output; and, connects the second input, said third adapter means and the first output in series.

5. A reconfiguration unit as set forth in claim 1 in which said second switching means in response to a fourth control signal from said programmed processor connects the first input, said first adapter means and the second output in series;

the second input, said second adapter means and the first output in series; and forms an isolated ring by connecting said third adapter means in series with said at least one port.

6. A reconfiguration unit as set forth in claim 1 in which said second switching means in response to a fifth control signal from said programmed processor connects the first input, said first adapter means and the second output in series;

the second input, said third adapter means and the first output in series; and, forms an isolated ring by connecting said second adapter means in series with said at least one port.

* * * * *